(12) United States Patent
Yang et al.

(10) Patent No.: US 11,785,592 B2
(45) Date of Patent: Oct. 10, 2023

(54) SIDELINK COMMUNICATION

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Jinyup Hwang, Seoul (KR); Jongkeun Park, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/963,870

(22) Filed: Oct. 11, 2022

(65) Prior Publication Data

US 2023/0051285 A1 Feb. 16, 2023

Related U.S. Application Data

(63) Continuation of application No. PCT/KR2021/004547, filed on Apr. 12, 2021.

(30) Foreign Application Priority Data

Apr. 16, 2020 (KR) .................. 10-2020-0046123

(51) Int. Cl.
*H04W 8/24* (2009.01)
*H04W 72/1263* (2023.01)
*H04W 52/38* (2009.01)
*H04W 92/18* (2009.01)

(52) U.S. Cl.
CPC ......... *H04W 72/1263* (2013.01); *H04W 8/24* (2013.01); *H04W 52/383* (2013.01); *H04W 92/18* (2013.01)

(58) Field of Classification Search
CPC .............................. H04W 8/24; H04W 52/383
See application file for complete search history.

(56) References Cited

U.S. PATENT DOCUMENTS

| | | | |
|---|---|---|---|
| 2019/0253977 A1 | 8/2019 | Wang et al. | |
| 2021/0329648 A1* | 10/2021 | Osawa | H04W 72/53 |
| 2022/0086765 A1* | 3/2022 | Zhang | H04W 52/50 |
| 2022/0110110 A1* | 4/2022 | Matsuda | H04W 72/51 |
| 2022/0330239 A1* | 10/2022 | Harada | H04W 74/08 |
| 2023/0006772 A1* | 1/2023 | Yoshioka | H04L 1/08 |

OTHER PUBLICATIONS

R4-1701550: 3GPP TSG-RAN WG4 Meeting #82, Athens, Greece, Feb. 13-17, 2017, Ericsson, "Discussion on Interruptions requirements for V2X," (4 Pages).

(Continued)

*Primary Examiner* — Congvan Tran
(74) *Attorney, Agent, or Firm* — BRYAN CAVE LEIGHTON PAISNER LLP

(57) ABSTRACT

One disclosure of the present specification provides a method by which a UE performs sidelink communication. The method may comprise the steps of: determining transmission power for SL transmission on the basis of capability information of the UE; determining transmission timing for the SL transmission on the basis of the capability information of the UE; and transmitting an SL signal on the basis of the transmission timing and the transmission power.

12 Claims, 23 Drawing Sheets

(56) References Cited

OTHER PUBLICATIONS

R2-1701143: 3GPP TSG-RAN2#97 meeting, Athens, Greece, Feb. 13-17, 2017, Samsung, "UE capabilities regarding per CC gaps by indicating RF structure," (35 Pages).

Huawei et al., "Remaining details of physical layer procedures for sidelink", R1-2001555, 3GPP TSG RAN WG1 Meeting #100e-bis, Apr. 11, 2020, see sections 5 and 16.2.4.3.

"3rd Generation Partnership Project; Technical Specification Group Radio Access Network; Evolved Universal Terrestrial Radio Access (E-UTRA); Physical channels and modulation (Release 16)", 3GPP TS 36.211 V16.1.0 (Mar. 2020), Apr. 3, 2020, see section 9.1.3.

LG Electronics, "Discussion on physical layer procedures for NR sidelink", R1-2001889, 3GPP TSG RAN WG1 Meeting #100bis, e-Meeting, Apr. 11, 2020, see sections 2-2.2.

Oppo, "Remaining issues of physical layer procedure for NR-V2X", R1-2001748, 3GPP TSG RAN WG1 #100bis, e-Meeting, Apr. 11, 2020, see section 2.5.

* cited by examiner

D/A

SIDELINK COMMUNICATION

This application is a Continuation Application of International Application No. PCT/KR2021/004547, filed on Apr. 12, 2021, which claims the benefit of and priority to Korean Application No. 10-2020-0046123, filed on Apr. 16, 2020, the contents of which are all hereby incorporated by reference herein in their entirety.

TECHNICAL FIELD

The present disclosure generally relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Sidelink (SL) communication is a communication scheme in which a direct link is established between User Equipments (UEs), and the UEs exchange voice and data directly with each other without intervention of a base station (BS). SL communication is under consideration as a solution to the overhead of a BS caused by rapidly increasing data traffic.

A method for the UE to simultaneously perform NR V2X (or SL) communication and NR Uu communication is being discussed. For example, the UE may simultaneously transmit the NR SL signal and the NR UL signal. However, in the prior art, a method for efficiently performing NR V2X (or SL) communication and NR Uu communication by a terminal capable of simultaneously performing NR SL signal transmission and NR UL signal transmission has not been discussed at all. For example, a method of supporting efficient NR V2X (or SL) communication and NR Uu communication of a terminal in consideration of the RF structure and/or capability of the terminal has not been discussed at all. Therefore, when such a terminal transmits the SL signal and the UL signal at the same time, according to the prior art, it is impossible to effectively determine (or set) the transmission timing and/or the transmission power.

SUMMARY

Accordingly, a disclosure of the present specification has been made in an effort to solve the aforementioned problem.

In order to solve the above problems, one disclosure of the present specification provides a method for a UE to perform sidelink communication. The method includes determining, based on the capability information of the UE, transmission power for SL transmission; determining a transmission timing for the SL transmission based on the capability information of the UE; and transmitting an SL signal based on the transmission timing and the transmission power.

In order to solve the above problems, one disclosure of the present specification provides a UE that performs sidelink communication. The UE includes at least one transceiver; at least one processor; and at least one memory to store instructions and operably electrically connectable to the at least one processor. The operations performed based on the execution of the instructions by the at least one processor include: determining, based on the capability information of the UE, transmission power for SL transmission; determining a transmission timing for the SL transmission based on the capability information of the UE; and transmitting an SL signal based on the transmission timing and the transmission power.

In order to solve the above problems, one disclosure of the present specification provides a method for a base station to perform communication. The method includes: receiving capability information of the UE from the UE; and, based on the capability information of the UE, transmitting scheduling information to the UE.

In order to solve the above problems, one disclosure of the present specification provides a base station for performing communication. The UE includes at least one transceiver; at least one processor; and at least one memory to store instructions and operably electrically connectable to the at least one processor. The operations performed based on the instruction being executed by the at least one processor may include: receiving capability information of the UE from the UE; and, based on the capability information of the UE, transmitting scheduling information to the UE.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: determining, based on the capability information of the device, a transmit power for SL transmission; determining a transmission timing for the SL transmission based on the capability information of the device; and generating an SL signal based on the transmission timing and the transmission power.

In order to solve the above problems, one disclosure of the present specification provides a non-volatile computer-readable storage medium in which instructions are recorded. The instructions, when executed by one or more processors, cause the one or more processors to: determine, based on capability information of a device, a transmit power for an SL transmission; determining a transmission timing for the SL transmission based on the capability information of the device; and generating an SL signal based on the transmission timing and the transmission power.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
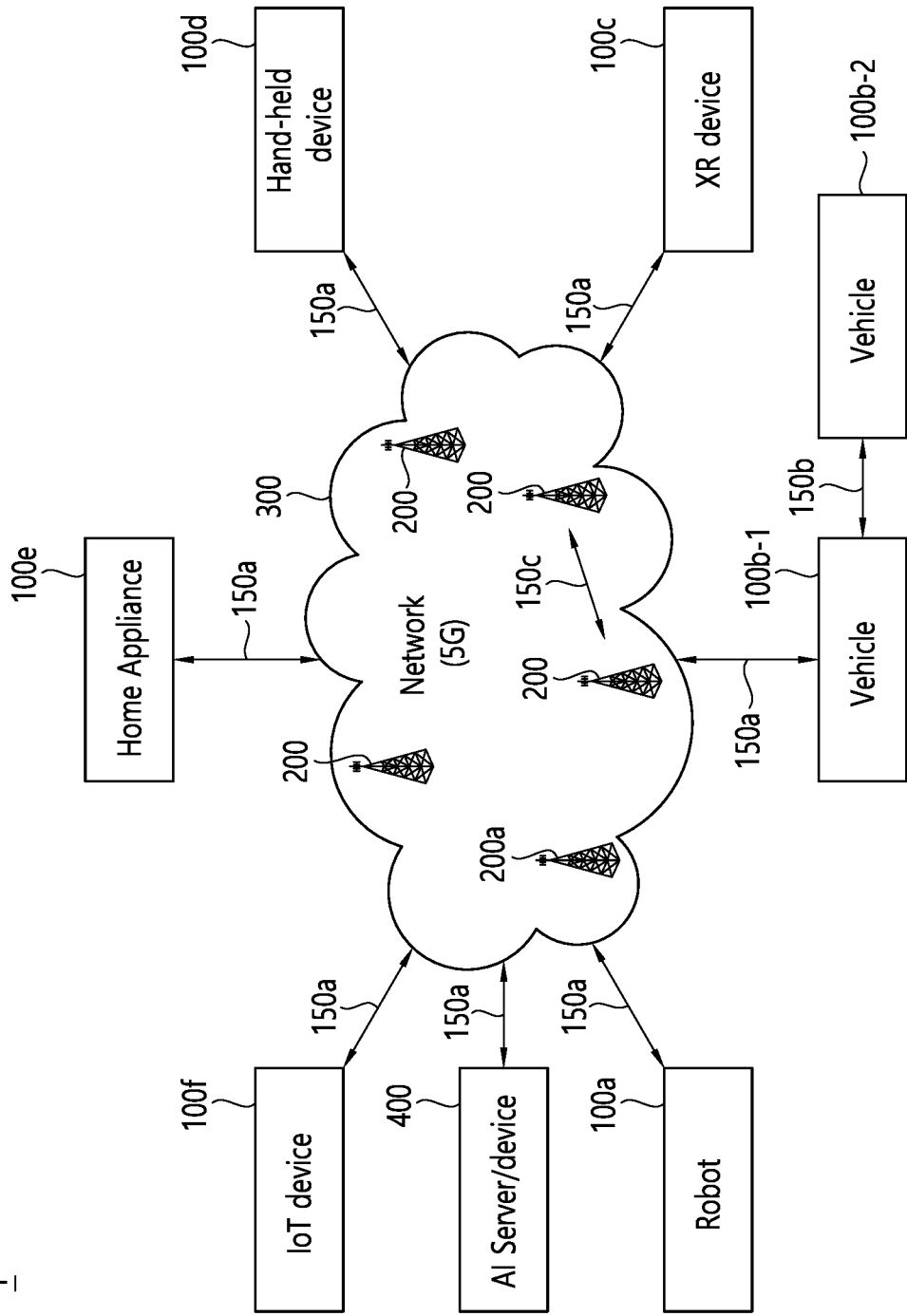
FIG. 1 shows an example of a communication system to which implementations of the present disclosure are applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system.

CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the accompanying drawings, a User Equipment (UE) is shown in an exemplary manner, however, the shown UE may also be referred to as a term such as a Terminal, a Mobile Equipment (ME), and the like. Furthermore, the UE may be not only a portable device such as a notebook, a mobile phone, a PDA, a smart phone, a multimedia device, and the like, but also a non-portable device such as a PC and a vehicle mounted device.

Hereinafter, a UE is used as an example of a wireless communication device (or wireless apparatus or a wireless device) for which wireless communication is available. The operation performed by a UE may be performed by a wireless communication device. The wireless communication device may also be referred to as a wireless apparatus or a wireless device. Hereinafter, an AMF may mean an AMF node, an SMF may mean an SMF node, and a UPF may mean a UPF node.

The term, "base station" used below may be referred to as a fixed station that communicates with a wireless device, generally, and may also be called a different term such as an evolved-NodeB (eNodeB), an evolved-NodeB (eNB), a Base Transceiver System (BTS), an Access Point, a Next generation NodeB (gNB), and the like.

I. Technique and procedure applicable to the disclosure of the present specification.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an ARNR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use.

The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
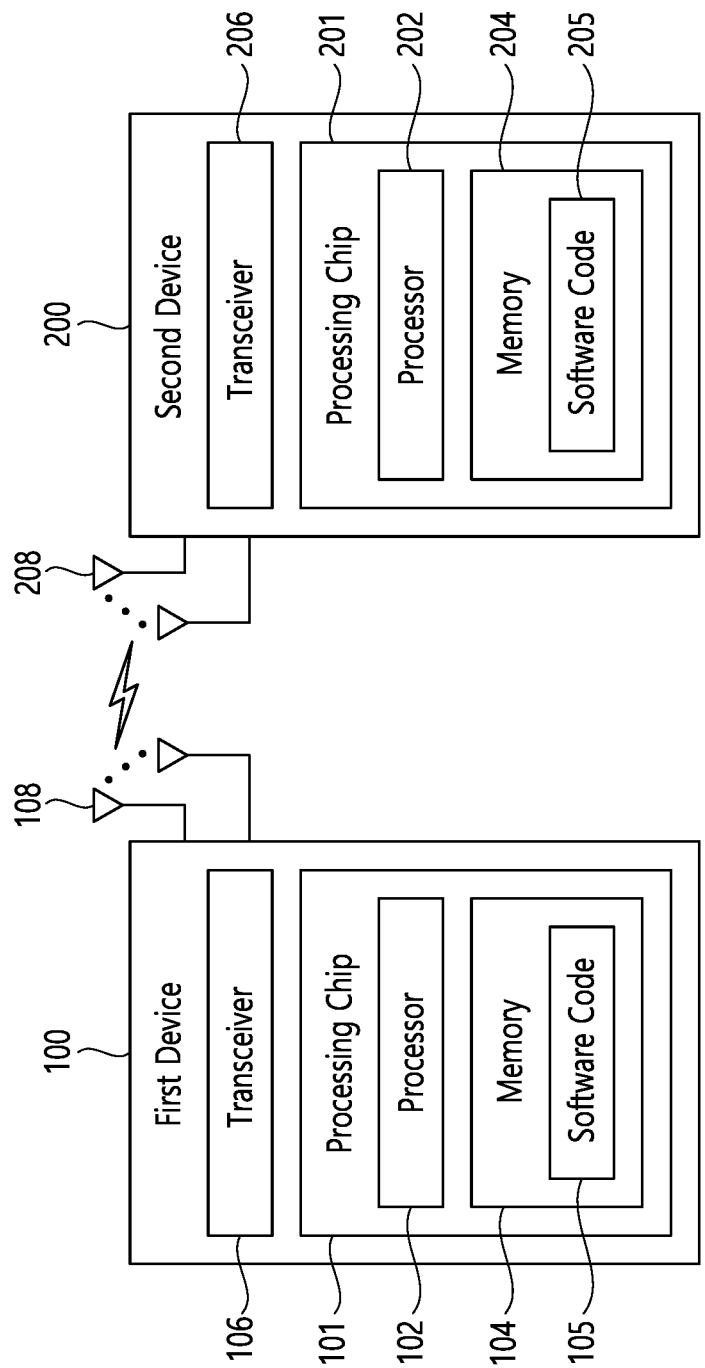
FIG. 2 shows an example of wireless devices to which implementations of the present disclosure are applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of (the wireless device 100a to 100f and the BS 200), {the wireless device 100a to 100f and the wireless device 100a to 100f} and/or (the BS 200 and the BS 200) of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMS), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
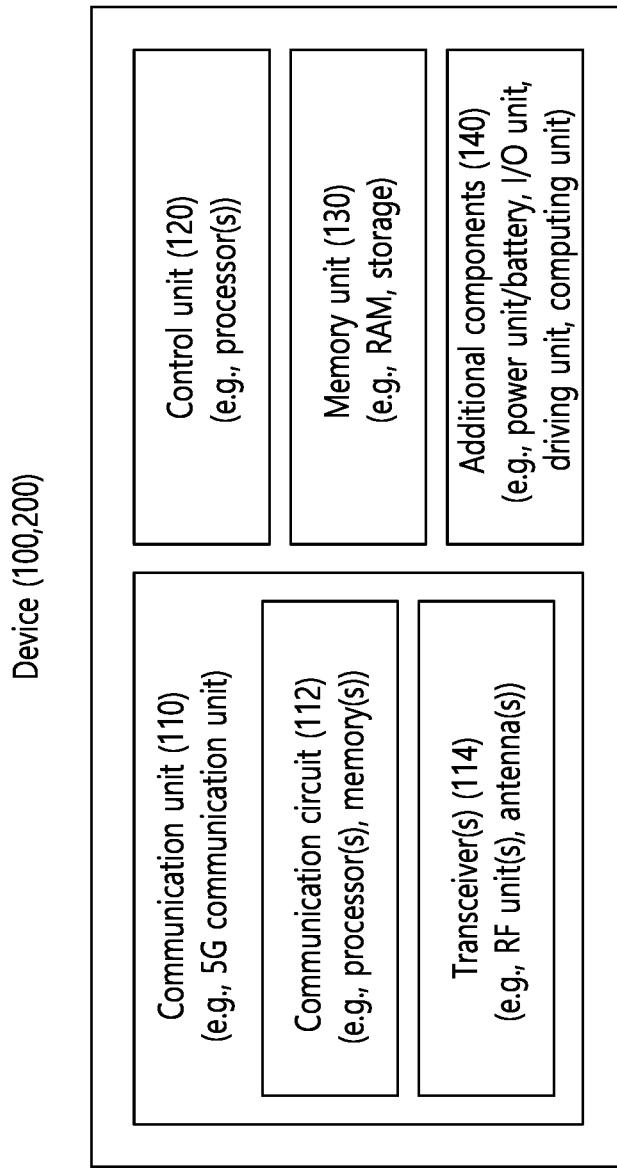
FIG. 3 shows an example of a wireless device to which implementations of the present disclosure are applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
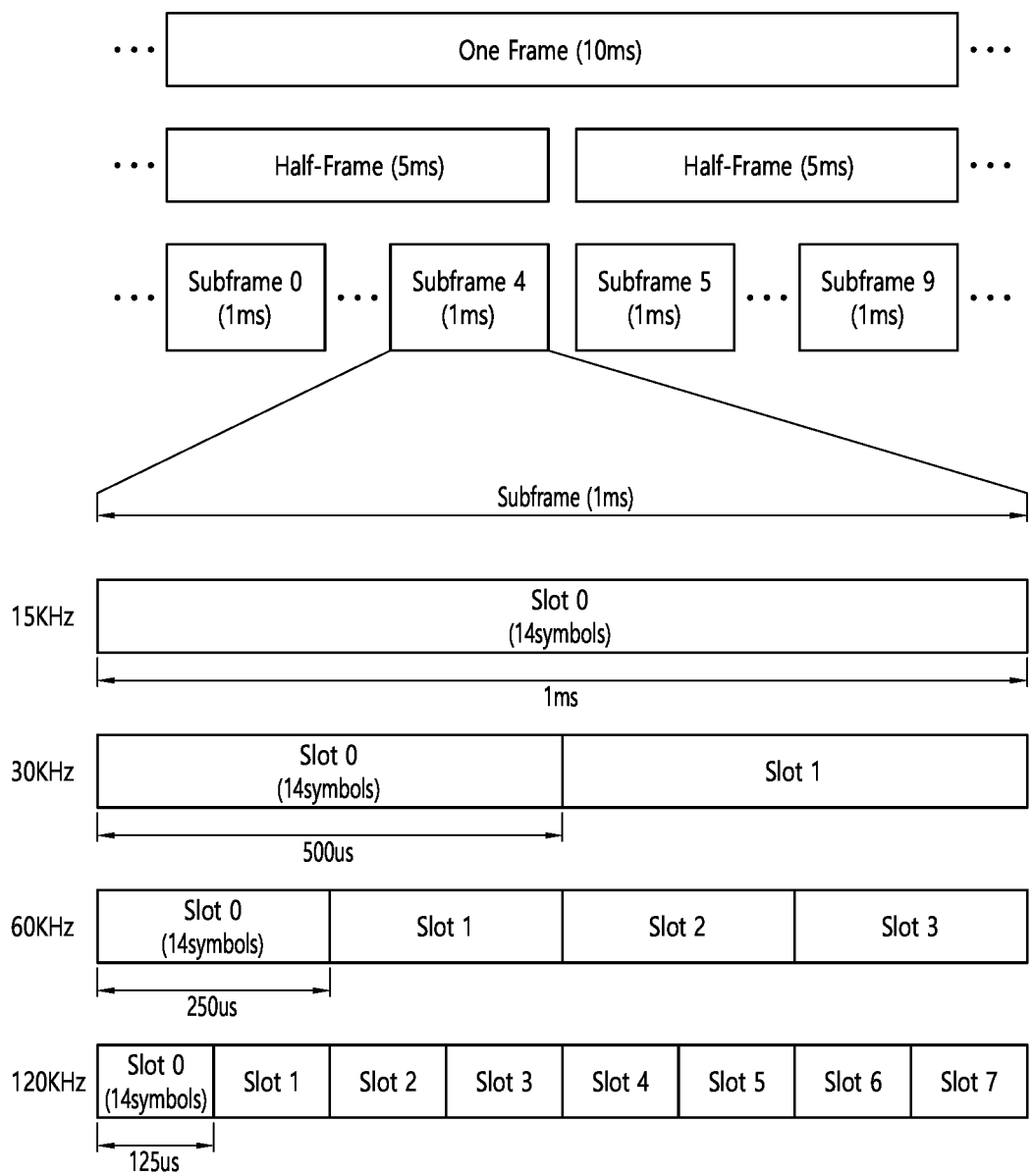
FIG. 4 illustrates an example of a structure of an NR system to which the implementation of the present disclosure is applied.

FIG. 4 illustrates an example of a structure of an NR system to which the implementation of the present disclosure is applied.

FIG. 4 shows a structure of an NR system, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In the case that a normal CP is used, each slot may include 14 symbols. In the case that an extended CP is used, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Figure 5:
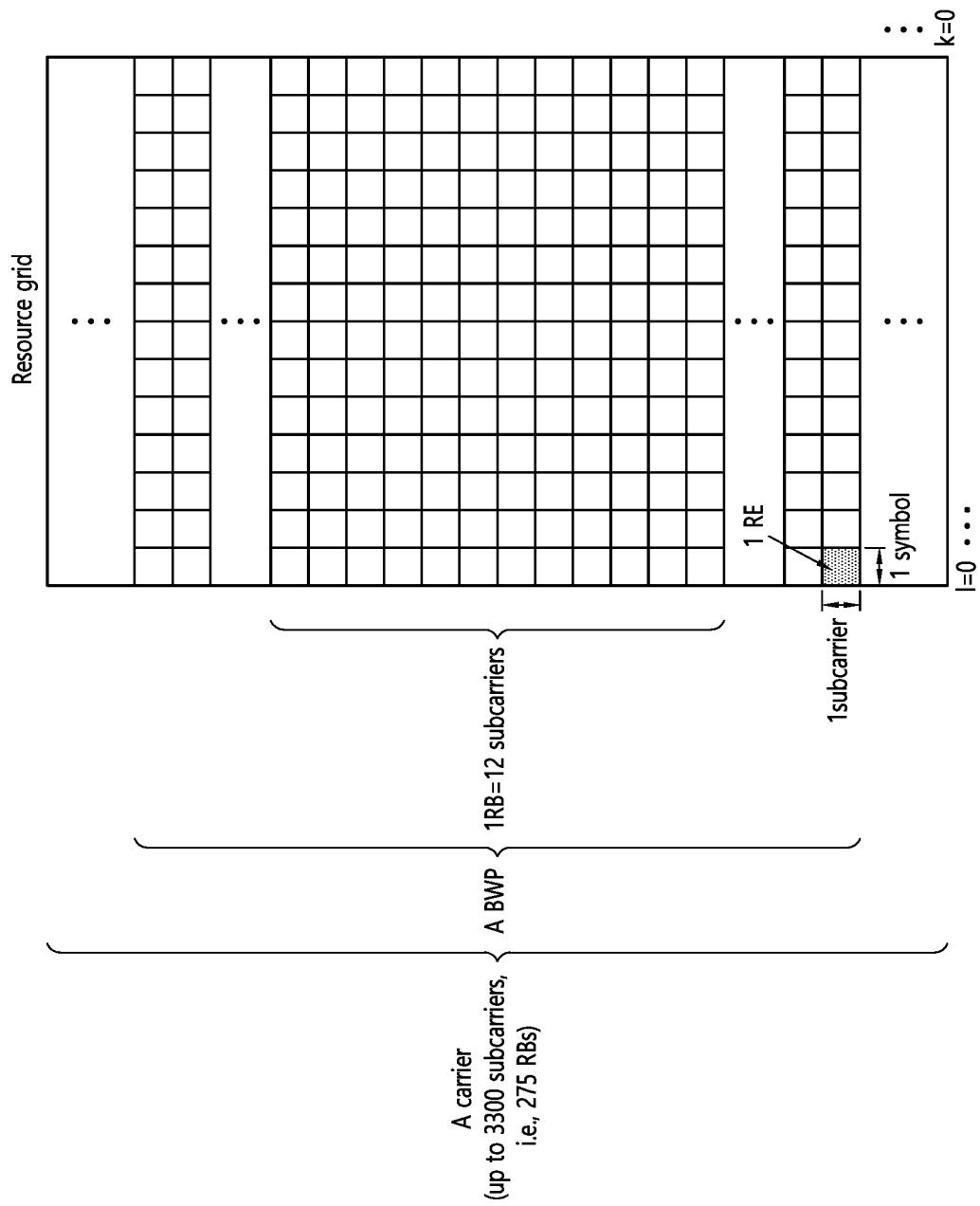
FIG. 5 illustrates an example of a structure of a slot of an NR system to which the implementation of the present disclosure is applied.

FIG. 5 illustrates an example of a structure of a slot of an NR system to which the implementation of the present disclosure is applied.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one type of numerology (e.g., SCS, CP length, etc.). A carrier may include a maximum of N BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, V2X or SL communication will be described.

Figure 6A:
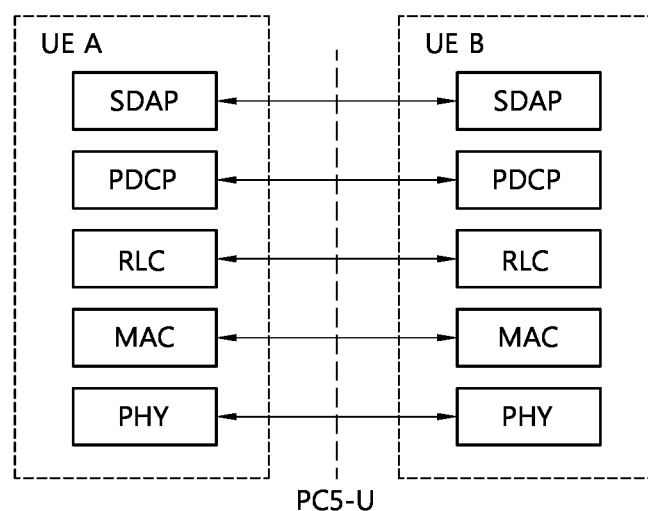
FIGS. 6a and 6b illustrate an example of a radio protocol architecture for a SL communication to which the implementation of the present disclosure is applied.
Figure 6B:
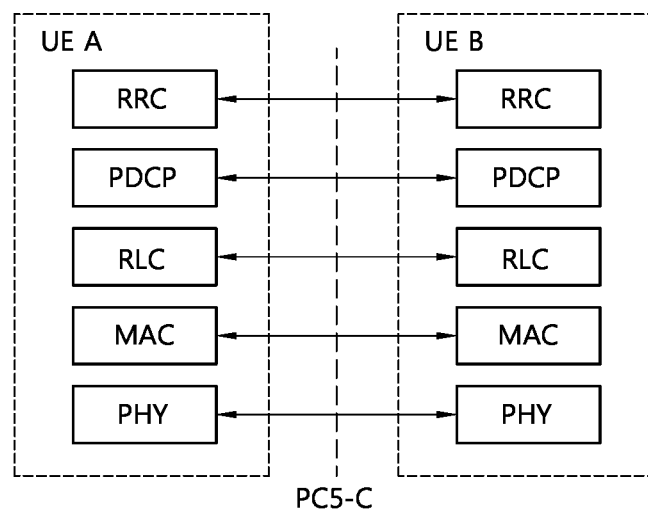

FIGS. 6a and 6b illustrate an example of a radio protocol architecture for a SL communication to which the implementation of the present disclosure is applied.

FIG. 6a and FIG. 6b show a radio protocol architecture for a SL communication, in accordance with an embodiment of the present disclosure. The embodiment of FIG. 6a and FIG. 6b may be combined with various embodiments of the present disclosure. More specifically, FIG. 6a shows a user plane protocol stack, and FIG. 6b shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which needs to be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
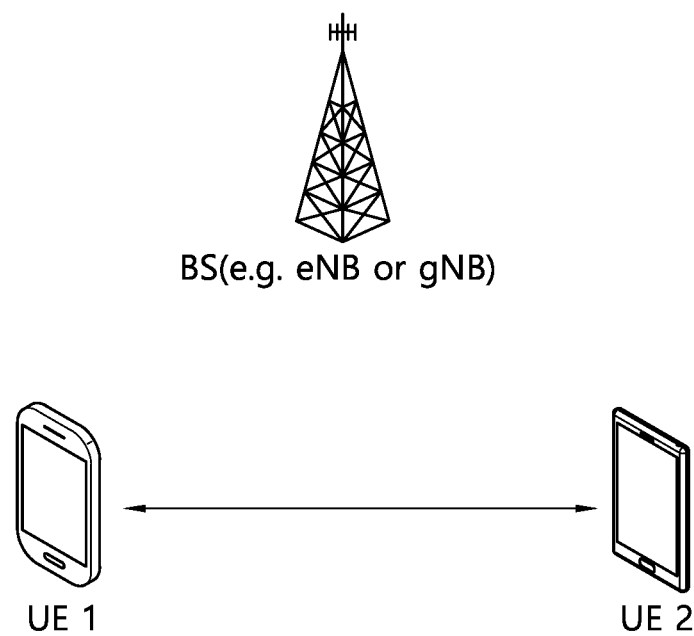
FIG. 7 illustrates an example of a UE performing V2X or SL communication to which the implementation of the present disclosure is applied.

FIG. 7 illustrates an example of a UE performing V2X or SL communication to which the implementation of the present disclosure is applied.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term "terminal" may generally imply a UE of a user. However, in the case that a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, in the case that the UE 1 is within a connectivity range of the BS, the BS may inform the UE 1 of the resource pool. On the other hand, in the case that the UE 1 is out of the connectivity range of the BS, another UE may inform the UE 1 of the resource pool, or the UE 1 may use a pre-configured resource pool.

In general, the resource pool may be configured in units of a plurality of resources, and each UE may select a unit of one or a plurality of resources to use it in SL signal transmission thereof.

Hereinafter, resource allocation in SL will be described.

Figure 8A:
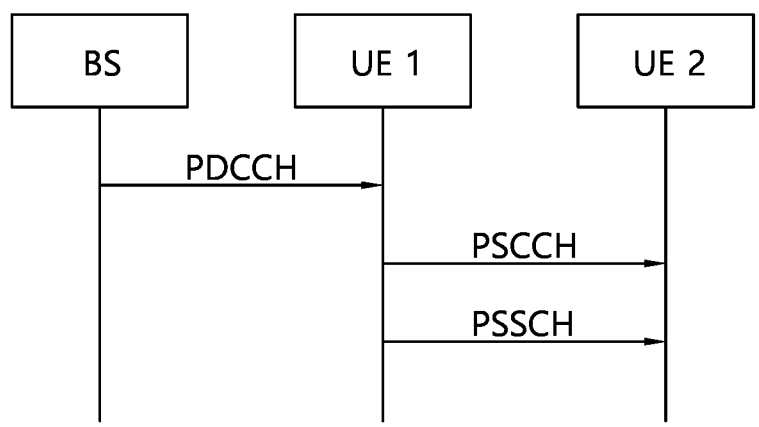
FIGS. 8a and 8b illustrate an example of a procedure of performing V2X or SL communication by a UE based on a transmission mode to which the implementation of the present disclosure is applied.
Figure 8B:
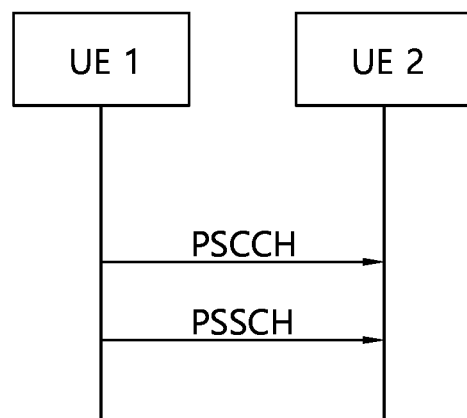

FIGS. 8a and 8b illustrate an example of a procedure of performing V2X or SL communication by a UE based on a transmission mode to which the implementation of the present disclosure is applied.

FIG. 8a and FIG. 8b show a procedure of performing V2X or SL communication by a UE based on a transmission mode, in accordance with an embodiment of the present disclosure. The embodiment of FIG. 8a and FIG. 8b may be combined with various embodiments of the present disclosure. In various embodiments of the present disclosure, the transmission mode may be called a mode or a resource allocation mode. Hereinafter, for the convenience of explanation, in LTE, the transmission mode may be called an LTE transmission mode. In NR, the transmission mode may be called an NR resource allocation mode.

For example, FIG. 8a shows a UE operation related to an LTE transmission mode 1 or an LTE transmission mode 3. Alternatively, for example, FIG. 8a shows a UE operation related to an NR resource allocation mode 1. For example, the LTE transmission mode 1 may be applied to general SL communication, and the LTE transmission mode 3 may be applied to V2X communication.

For example, FIG. 8b shows a UE operation related to an LTE transmission mode 2 or an LTE transmission mode 4. Alternatively, for example, FIG. 8b shows a UE operation related to an NR resource allocation mode 2.

Referring to FIG. 8a, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 8b, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in units of subchannels. In addition, the UE 1 which has autonomously selected the resource within the resource pool may transmit the SCI to the UE 2 through a PSCCH, and thereafter may transmit data based on the SCI to the UE 2 through a PSSCH.

For reference, Table 3 below represents an example of an operating band used for V2X (or SL) communication.

TABLE 3

| Operating Band | V2X Operating Band | V2X UE transmit $F_{UL\_low}$-$F_{UL\_high}$ | V2X UE receive $F_{DL\_low}$-$F_{DL\_high}$ | Duplex Mode | Interface |
|---|---|---|---|---|---|
| 47 | 47 | 5855 MHz-5925 MHz | 5855 MHz-5925 MHz | HD(Half Duplex) | PC5 |
| 39 | 39 | 1880 MHz-1920 MHz | 1880 MHz-1920 MHz | TDD | PC5 and/or Uu |

In the case that an operating band 47 according to the example of Table 3 is used for E-UTRA V2X (or SL) communication, the operating band 47 may be referred to as B47. In the case that the operating band 47 according to the example of Table 3 is used for NR V2X (or SL) communication, the operating band 47 may be referred to as n47. In the case that an operating band 39 according to the example of Table 3 is used for E-UTRA V2X (or SL) communication, the operating band 39 may be referred to as B39. In the case that the operating band 39 according to the example of Table 3 is used for NR V2X (or SL) communication, the operating band 39 may be referred to as n39.

For reference, at least one proposal scheme proposed according to various embodiments of the present disclosure may be applied to not only sidelink communication or V2X communication based on a PC5 interface or an SL interface (e.g., PSCCH, PSSCH, PSBCH, PSSS/SSSS, etc.), but also sidelink communication or V2X communication based on a Uu interface (e.g., PUSCH, PDSCH, PDCCH, PUCCH, etc.).

In the various embodiments of the present disclosure, a receiving operation of a UE may include a decoding operation and/or a receiving operation of a sidelink channel and/or a sidelink signal (e.g., PSCCH, PSSCH, PSFCH, PSBCH, PSSS/SSSS, etc.). In the various embodiments of the present disclosure, a transmitting operation of a UE may include a transmitting operation of a sidelink channel and/or a sidelink signal (e.g., PSCCH, PSSCH, PSFCH, PSBCH, PSSS/SSSS, etc.).

Meanwhile, in the various embodiments of the present disclosure, for example, for the convenience of description, a (physical) channel used for an RX UE to transmit at least one of the following information to a TX UE may be referred to as PSFCH.

SL HARQ feedback, SL CSI, SL (L1) RSRP

Meanwhile, in the various embodiments of the present disclosure, a Uu channel may include a UL channel and/or a DL channel. For example, the UL channel may include PUSCH, PUCCH, and the like. For example, the DL channel may include PDCCH, PDSCH, and the like. For example, an SL channel may include PSCCH, PSSCH, PSFCH, PSBCH, and the like.

<Timing Advance (TA)>

Hereinafter, a timing advance (TA) related to transmission of a signal on a specific carrier (eg, NR UL signal transmission or NR V2X (or SL) signal transmission) will be described.

1. Before describing the method for determining the timing advance value associated with the D2D transmission, the symbols and abbreviations associated with the timing advance values are as follows.

$T_s$: Basic time unit. For reference, instead of $T_s$, $T_c$ may be used as a basic time unit. For example, in NR-based communication, $T_c$ may be used as a basic time unit.

$N_{TA}$: Timing offset between the uplink and the downlink in the UE, expressed in units of Ts $N_{TA\_offset}$: Fixed timing advance offset, expressed in units of Ts $N_{TA,SL}$: Timing offset between a sidelink and timing reference frames in the UE, expressed in units of Ts 2. Frame structure In the time domain, the sizes of various fields may be expressed as the number of time units, i.e. Ts=1/(15000×2048) seconds.

Downlink, uplink, and, sidelink transmissions may be configured into THE radio frames with Tf=307200×Ts=10 ms duration.

Hereinafter, two types of radio frame structures may be supported.

Type 1: Applicable to FDD

Type 2: Applicable to TDD

Transmissions in multiple cells may be aggregated with a maximum of four secondary cells in addition to the primary cell. In multi-cell aggregation, different frame structures may be used in different serving cells.

3. Uplink-downlink frame timing

Figure 9:
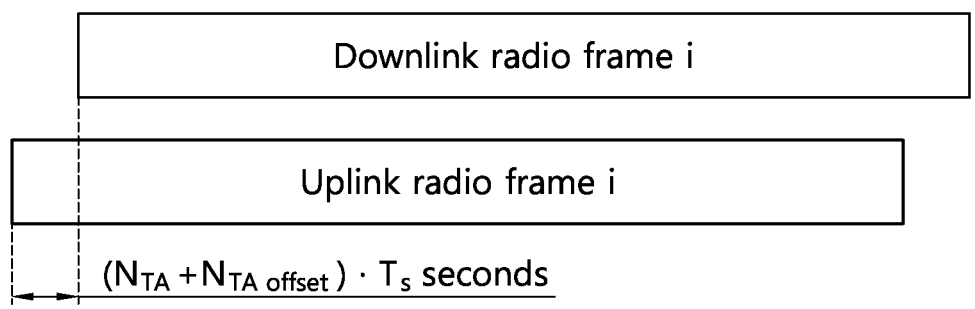
FIG. 9 shows an example schematically illustrating the relationship between uplink timing and downlink timing.

FIG. 9 shows an example schematically illustrating the relationship between uplink timing and downlink timing.

FIG. 9 schematically illustrates an uplink-downlink timing relationship. As illustrated in FIG. 9, transmission of uplink radio frame number i from the UE may start earlier than a corresponding downlink radio frame in the UE by (NTA+NTAoffset)×Ts second (where 0<=$N_{TA}$<=20412).

Here, for frame structure type 1, $N_{TAoffset}$ may correspond to '0' and for frame structure type 2, $N_{TAoffset}$ may correspond to '624'. In this case, all slots are not transmitted in the radio frame. The example here may correspond to TDD. In this case, only a subset of the slots in the radio frame may be transmitted.

4. Timing

Figure 10:
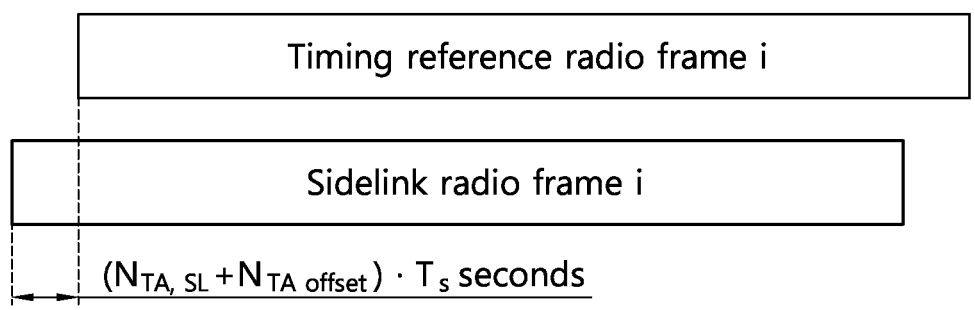
FIG. 10 shows an example schematically illustrating the relationship between downlink timing and sidelink timing.

FIG. 10 shows an example schematically illustrating the relationship between downlink timing and sidelink timing.

As illustrated in FIG. 10, transmission of sidelink radio frame number i from the UE may start earlier than a corresponding timing reference frame in the UE by $(N_{TA,SL}+N_{TAoffset}) \times T_s$ second (where $0 <= N_{TA} <= 20412$).

The UE may not need to receive the sidelink or the downlink transmission earlier than 624 Ts after the sidelink transmission is finished.

In the case where the UE has a serving cell satisfying an S criterion,

The timing of the reference radio frame i may be the same as the downlink radio frame i in the same frame.

A specific value corresponding to $N_{TAoffset}$ may be given.

In other cases,

The timing of the reference radio frame i can be obtained by being inherent by a predetermined method.

$N_{TAoffset}=0$

An amount of $N_{TA}$,SL between the channel and the signal may be as follows.

$$N_{TA,SL} = \begin{cases} N_{TA} \text{ for PSSCH in sidelink transmission mode 1} \\ 0 \text{ for all other cases} \end{cases} \text{[Equation 1]}$$

II. Disclosure of the Present Specification

The disclosures described below in this specification may be implemented in one or more combinations (eg, a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementary.

For reference, in the disclosure of the present specification, the sidelink (SL), V2X, and V2X sidelink (SL) may be used as the same meaning.

Disclosure of the present specification describes a method by which the terminal can perform efficient V2X communication. For example, the disclosure of the present specification describes a method in which a terminal capable of simultaneously performing NR V2X sidelink transmission and NR uplink (UL) transmission can perform efficient V2X communication.

For example, in the following, a method in which adjacent channels within the same licensed operating band (eg, TDD licensed band) are allocated as NR Uu (eg, NR UL and/or NR DL) and NR SL (sidelink), respectively, and in which the UE to simultaneously transmit the NR UL signal and the NR SL signal will be described. In addition, the following describes UE capability, Tx (transmission) timing and/or power settings related to a terminal that simultaneously performs NR V2X sidelink transmission and NR uplink (UL) transmission.

When TDD is used, for the UE, a UL-DL configuration may be basically configured. Based on the UL-DL configuration, the UE may know the UL slot and the DL slot configured in the TDD operating band. In the same TDD licensed operating band, the UE may perform NR SL communication only in a slot set to UL (eg, a UL slot). In order for the UE to perform NR SL communication only in the UL slot, the network (eg, the base station) must always configure the NR SL resource allocation to be possible only in the UL slot. For example, the network (eg, a base station) may provide the UE with configuration information that NR SL resource allocation is possible only in the UL slot. Setting/applying the NR SL resource by the terminal itself may be limited. For example, the UE cannot allocate an NR SL resource to a slot other than a UL slot.

The terminal using the TDD operating band may transmit the NR SL signal only when the UE transmits the UL signal in a slot allocated (or set) for the NR UL. In other words, the terminal using the TDD operating band may transmit only the NR SL signal when the UL signal is transmitted in a slot allocated (or set) to the NR UL. In addition, when the UE does not transmit a UL signal in a slot allocated (or configured for) NR UL, the UE may perform both transmission and reception through SL. For example, in a slot allocated (or set) to NR UL, when the terminal does not transmit a UL signal, the terminal may transmit an SL signal or receive an SL signal.

The UE may determine the timing to transmit the UL signal based on timing advance (TA) and $N_{TA\_offset}$ based on the DL reception timing. For example, when the UE transmits the NR UL signal, the UE may transmit the UL signal earlier than the DL reception timing in consideration of TA (timing advance) and $N_{TA\_offset}$ based on the DL reception timing. For example, as described with reference to FIG. 9, the UE may transmit the UL signal at a time advanced by a value based on TA (timing advance) and $N_{TA\_offset}$ from the DL reception timing (eg, the start time of DL radio frame i).

For reference, standards related to $N_{TA\_offset}$ are defined as examples in Table 4 below.

TABLE 4

| Frequency range and band of cell used for uplink transmission | $N_{TA\_offset}$ (Unit: $T_C$) |
|---|---|
| FR1 FDD band without LTE-NR coexistence case or FR1 TDD band without LTE-NR coexistence case | 25600 (Note 1) (13 us) |
| FR1 FDD band with LTE-NR coexistence case | 0 (Note 1) |
| FR1 TDD band with LTE-NR coexistence case | 39936 (Note 1) (20 us) |
| FR2 | 13792 (7 us) |

The example in Table 4 shows the value of $N_{TA\_offset}$. In the example of Table 4, $T_c$ may mean a basic time unit.

In Table 4, Note 1 may mean the following. The UE (eg, UE) may identify $N_{TA\_offset}$ based on information related to the TA offset (eg, n-TimingAdvanceOffset). The UE may receive information related to the TA offset (eg, n-TimingAdvanceOffset) from the base station. When the terminal does not receive information related to the TA offset (eg, n-TimingAdvanceOffset), a default value of $N_{TA\_offset}$ for the FR1 band may be set to 25600. For a plurality of UL carriers within the same Timing Advance Group (TAG), the UE may expect that, for all UL carriers, information related to TA offset (eg, n-TimingAdvanceOffset) is provided with the same value, and may expect that the $N_{TA\_offset}$ value is provided as 39936 for the FDD serving cell.

Meanwhile, when the UE transmits the NR SL signal, the UE may determine the transmission timing of the NR SL signal based on a synchronization reference (eg, a synchronization reference source).

Hereinafter, an example in which the terminal determines the transmission timing of the NR SL signal will be described.

For example, when the NR Cell is a synchronization reference (eg, a synchronization reference source), the SL timing advance (TA) and $N_{TA\_offset}$ may be determined as in the following example.

A detailed description of the case where the NR Cell is a synchronization reference source is as follows.

When the reference timing used for SL transmission in the non-V2X sidelink carrier is the NR serving cell, the following description is applicable. Sidelink transmission may be performed before $(N_{TA,SL}+N_{TA\_offset})*T_c$, from a time point, at which a first detected path in time of a downlink frame transmitted from a reference cell (ie, an NR cell serving as a synchronization reference source) is received. Here, $N_{TA\_offset}=0$, and $N_{TA,SL}=0$. For reference, $N_{TA,SL}$ may be SL TA.

Referring to the example of determining the transmission timing of the UL signal and the example of determining the transmission timing of the SL signal described above, it is not allowed to perform NR UL transmission and NR SL transmission at the same time in the conventional standard. For example, TA (timing advance) ($N_{TA}$) and $N_{TA\_offset}$ used for the transmission timing of the UL signal have different values from SL TA($N_{TA\_offset}$) and $N_{TA,SL}$ used for the SL signal transmission timing. Therefore, the NR UL transmission timing and the NR SL transmission timing based on the DL transmission timing are different from each other.

Through the following example, it will be described in detail that the conventional standard does not allow NR UL transmission and NR SL transmission to be performed at the same time.

For example, a situation is assumed that the DL reception timing (propagation delay) is 30 us based on gNB in an FR1 TDD cell having a cell radius of 9 km.

i) An example in the FR1 TDD band without LTE-NR coexistence situation is as follows. $N_{TA}$ and $N_{TA\_offset}$ for determining the UL transmission time may be determined as in the following example. $N_{TA}=2*$propagation delay$=2*30$ us$=60$ us. $N_{TA\_offset}=25600*T_c=13$ us. Since the UL transmission time is $N_{TA+NTA\_offset}$, it may be 60 us+13 us=73 us. That is, based on the DL transmission timing, UL transmission may be started before 73 us. Meanwhile, since the SL transmission time is $N_{TA\_offset}=0$ and $N_{TA,SL}=0$, it may be $N_{TA,SL+NTA\_offset}=0$ us. In summary, UL transmission starts before 73 us based on the DL transmission timing, but SL transmission may start before 0 us. That is, conventionally, NR UL transmission and NR SL transmission cannot be started at the same time.

ii) An example in the FR1 TDD band with LTE-NR coexistence situation is as follows. $N_{TA}$ and $N_{TA\_offset}$ for determining the UL transmission time may be determined as in the following example. $N_{TA}=2*$propagation delay$=2*30$ us$=60$ us. $N_{TA\_offset}=39936*T_c=20$ us. Since the UL transmission time is $N_{TA+NTA\_offset}$, it may be 60 us+20 us=80 us. That is, based on the DL transmission timing, UL transmission may be started before 80 us. Meanwhile, since the SL transmission time is $N_{TA\_offset}=0$ and $N_{TA,SL}=0$, it may be $N_{TA,SL+NTA\_offse}=0$ us. In summary, UL transmission starts before 73 us based on the DL transmission timing, but SL transmission may start before 0 us. That is, conventionally, NR UL transmission and NR SL transmission cannot be started at the same time.

In both examples of i) and ii) above, the SL transmission time starts before '0 us' based on the DL reception time, but the UL transmission time starts before 73 us and 80 us, respectively, based on the DL reception time. That is, according to the prior art, the SL transmission time and the UL transmission time are started at different points in time.

The disclosure of the present specification proposes an example of a radio frequency (RF) structure for a terminal capable of simultaneously performing SL transmission and UL transmission. According to the example of the RF structure proposed in the disclosure of this specification, the UE may start SL transmission and UL transmission at the same time point, or may start SL transmission and UL transmission at different time points. For example, depending on the RF structure of the terminal, it may be determined whether the terminal supports SL transmission and UL transmission at different times.

The following FIGS. 11 to 14 are examples of the RF structure of the terminal proposed in the disclosure of the present specification. The transceiver of the terminal may include the RF structure of the terminal described in the examples of FIGS. 11 to 14.

Figure 11:
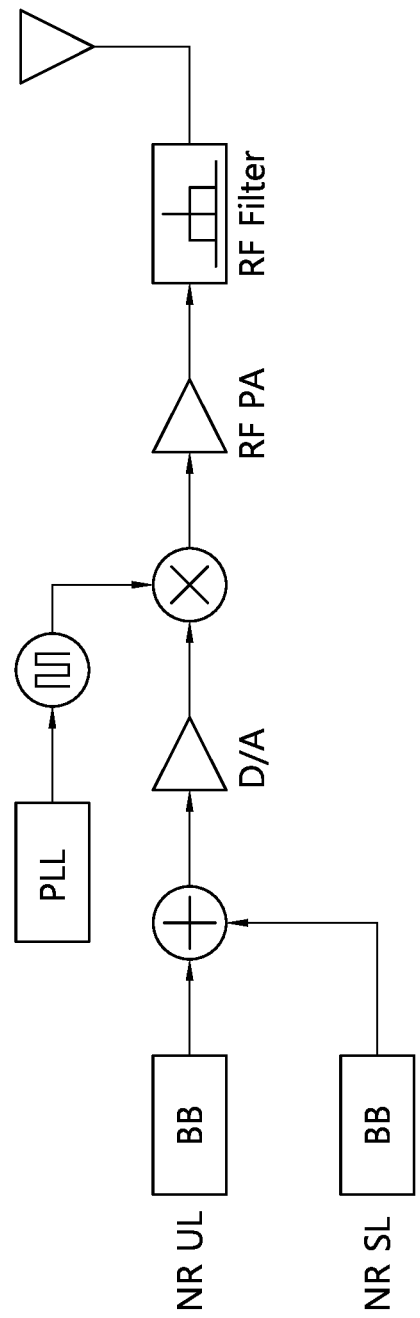
FIG. 11 shows an example of RF structure Type 1 of a terminal according to the disclosure of the present specification.

The example of FIG. 11 shows an example of RF structure type 1 of the terminal. RF structure type 1 may include a separated baseband (BB) for NR UL transmission and NR SL transmission. RF structure type 1 may include a single phase locked loop (PLL), a single PA, and a single antenna for NR UL transmission and NR SL transmission.

Figure 12:
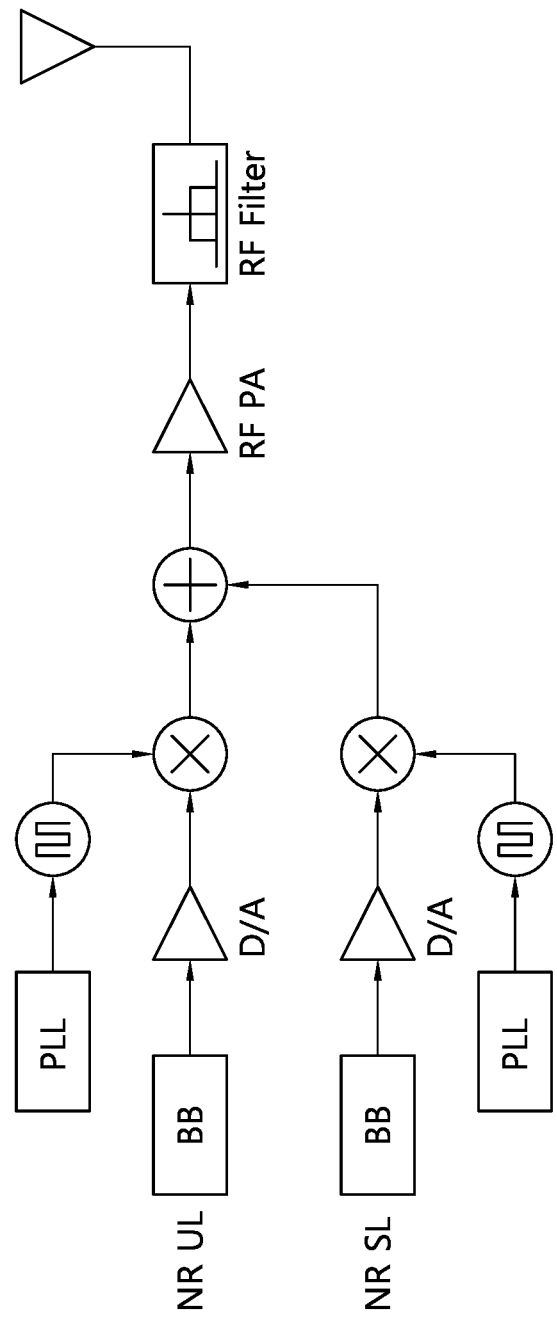
FIG. 12 shows an example of RF structure Type 2 of a terminal according to the disclosure of the present specification.

The example of FIG. 12 shows an example of RF structure type 2 of the terminal. RF structure type 2 may include a separated baseband (BB) and a separate PLL for NR UL transmission and NR SL transmission. RF structure type 2 may include a single PA and a single antenna for NR UL transmission and NR SL transmission.

Figure 13:
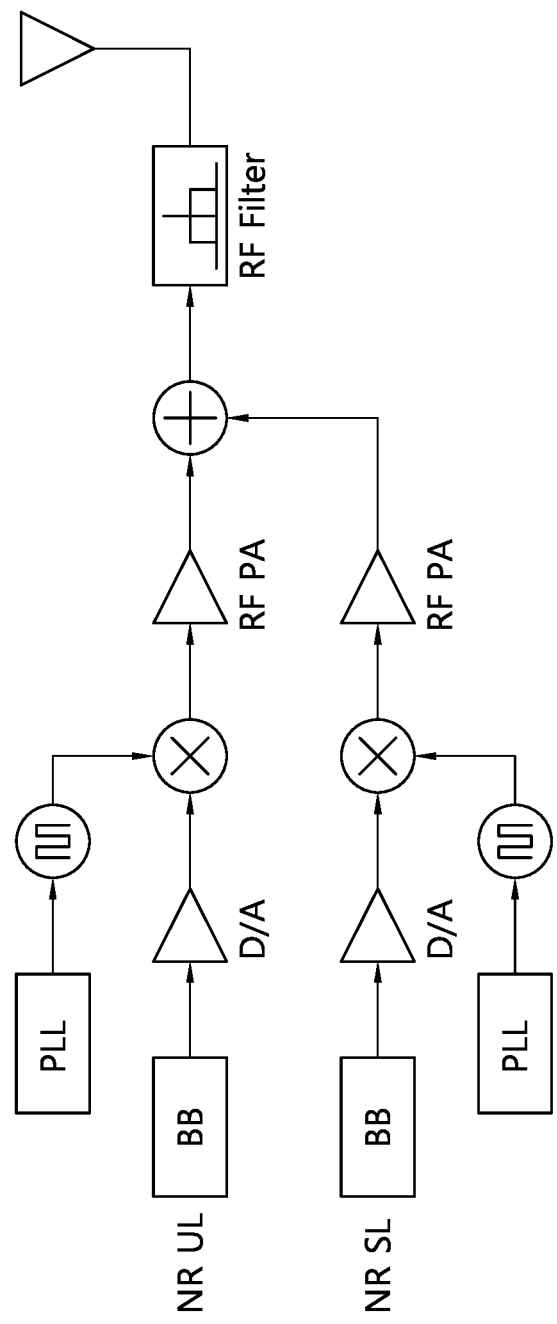
FIG. 13 shows an example of RF structure Type 3 of a terminal according to the disclosure of the present specification.

The example of FIG. 13 shows an example of RF structure type 3 of the terminal. RF structure type 3 may include a separate baseband (BB), a separate PLL, and a separate PA for NR UL transmission and NR SL transmission. RF structure type 3 may include a single antenna for NR UL transmission and NR SL transmission.

Figure 14:
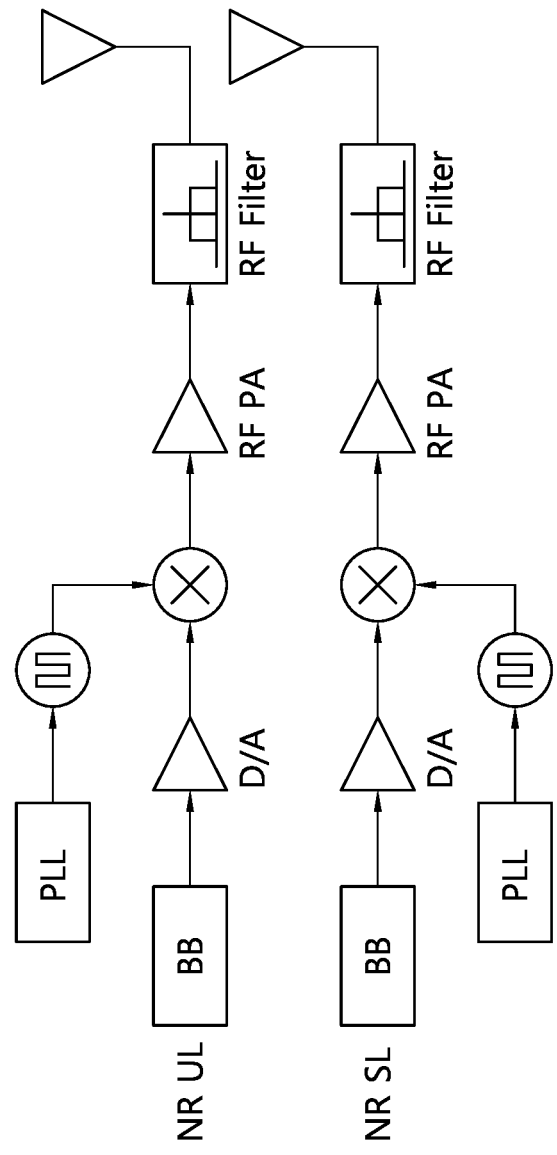
FIG. 14 shows an example of RF structure Type 4 of a terminal according to the disclosure of the present specification.

The example of FIG. 14 shows an example of RF structure type 4 of the terminal. RF structure type 4 may include a separated baseband (BB), a separate PLL, a separate PA, and a separate antenna for NR UL transmission and NR SL transmission.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 11 shows an example of RF structure Type 1 of a terminal according to the disclosure of the present specification.

The example of FIG. 11 shows an example of RF structure type 1 of the terminal (separated BBs (BaseBand)+single PLL+single PA+single Antenna). RF structure type 1 may include a separated baseband (BB) for NR UL transmission and NR SL transmission. RF structure type 1 may include a single PLL, a single PA, and a single antenna for NR UL transmission and NR SL transmission.

Figure 18A:
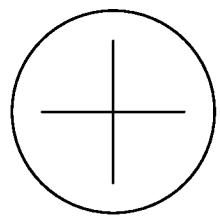
FIGS. 18a to 18d are diagrams for describing the example of FIG. 11 in detail.
Figure 18B:
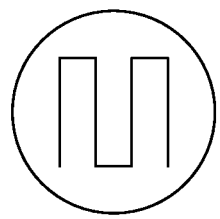
Figure 18C:
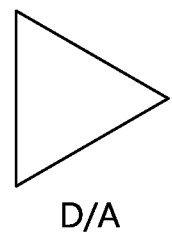
Figure 18D:
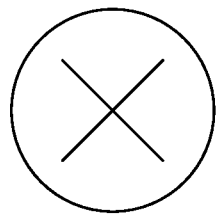

In the example of FIG. 11, FIG. 18a may mean a combiner. FIG. 18b may mean an oscillator. FIG. 18c may mean digital to analog converters. FIG. 18d may mean a mixer. BB may be BaseBand. The RF filter may be, for example, a bandpass filter. Descriptions related to combiners, oscillators, digital to analog converters, mixers, basebands, and RF filters may be equally applied to the examples of FIGS. 12 to 14.

A UE having RF structure Type 1 cannot support different transmission reference times of NR UL and NR SL due to one phase locked loop (PLL). In addition, both UL power control and SL power control cannot be supported due to a single power amplifier (PA).

This is because a phase locked loop (PLL) plays a role of adjusting a signal transmission timing. Since the UE performs NR UL transmission and NR SL transmission using one PLL, a UE having a Type 1 structure cannot support that the NR UL transmission reference time and the NR SL transmission reference time are different from each other.

Also, the PA may be used for power control. Since the UE performs NR UL transmission and NR SL transmission using one PA, the UE cannot control power for NR UL transmission and power for NR SL transmission, respectively.

As a method for a UE having RF structure Type 1 to support simultaneous transmission of NR UL and NR SL, the disclosure of the present specification suggests setting $N_{TA\_offset}$ and $N_{TA,SL}$ for NR SL to be the same as NR Uu. In other words, the transmission timing of the NR SL signal may be set to be the same as the transmission timing of the NR UL signal. For example, $N_{TA\_offset}$ and $N_{TA,SL}$ may be set as in the following example:

$N_{TA\_offset}$ of NR SL=$N_{TA\_offset}$ NR UL; and
$N_{TA,SL}=N_{TA}$.

Then, the UE having the RF structure Type 1 may start the NR SL transmission at the same timing as the NR UL transmission.

For power control of a terminal having RF structure Type 1, it is proposed to apply UL based power control (eg, (UL based closed-loop power control)) to both UL and SL. The power control of the terminal having RF structure Type 1 is as follows:

NR UL power: UL closed loop power control based power setting; and

NR SL power: Power setting based on UL closed loop power control.

Then, the UE having the RF structure Type 1 may set (or control) the power for transmitting the NR SL signal to be the same as the power for transmitting the NR UL signal.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 12 shows an example of RF structure Type 2 of a terminal according to the disclosure of the present specification.

The example of FIG. 12 shows an example of RF structure type 2 of the terminal (separated BBs (BaseBand)+separated PLL+single PA+single antenna). RF structure type 2 may include a separated baseband (BB) and a separate PLL for NR UL transmission and NR SL transmission. RF structure type 2 may include a single PA and a single antenna for NR UL transmission and NR SL transmission.

Since the terminal having the RF structure Type 2 includes an individual phase locked loop (PLL) for each of NR UL and NR SL, the terminal can support different transmission reference times of NR UL and NR SL. That is, the terminal having the RF structure Type 2 may simultaneously perform NR UL transmission and NR SL transmission even if the transmission timing of the NR UL signal and the transmission timing of the NR SL signal are different from each other. Meanwhile, the terminal having the RF structure Type 2 cannot support both UL power control and SL power control due to one power amplifier (PA).

Since the UE performs NR UL transmission and NR SL transmission using one PA, the UE cannot control power for NR UL transmission and power for NR SL transmission, respectively.

As a method for a terminal having RF structure Type 2 to support simultaneous transmission of NR UL and NR SL, the disclosure of the present specification proposes that the terminal independently sets the transmission timing of the NR UL signal and the transmission timing of the NR SL signal. For example, the terminal having the RF structure Type 2 determines the transmission timing of the NR UL signal based on the $N_{TA\_offset}$ and $N_{TA,SL}$ of the currently defined NR UL, the terminal may determine the transmission timing of the NR SL signal based on $N_{TA\_offset}$ and NIA of the NR SL. A terminal having RF structure Type 2 may start NR SL transmission at timing independent of NR UL transmission.

For power control of a terminal having RF structure Type 2, it is proposed to apply UL based power control (eg, (UL based closed-loop power control)) to both UL and SL. The power control of the terminal having the RF structure Type 2 is as follows:

NR UL power: UL closed loop power control based power setting; and

NR SL power: UL closed loop power control based power setting based.

Then, the terminal having the RF structure Type 2 may set (or control) the power for transmitting the NR SL signal to be the same as the power for transmitting the NR UL signal.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 13 shows an example of RF structure Type 3 of a terminal according to the disclosure of the present specification.

The example of FIG. 13 shows an example of RF structure type 3 (separated BBs (BaseBand)+separated PLL+separated PA+single antenna) of the terminal. RF structure type 3 may include a separate baseband (BB), a separate PLL, and a separate PA for NR UL transmission and NR SL transmission. RF structure type 3 may include a single antenna for NR UL transmission and NR SL transmission.

Since the terminal having the RF structure Type 3 includes an individual phase locked loop (PLL) for each of NR UL and NR SL, the terminal can support different transmission reference times of NR UL and NR SL. That is, the terminal having the RF structure Type 3 may simultaneously perform NR UL transmission and NR SL transmission even if the transmission timing of the NR UL signal and the transmission timing of the NR SL signal are different from each other. Meanwhile, a terminal having RF structure Type 3 may support both UL power control and SL power control due to individual power amplifiers (PAs) for NR UL and NR SL, respectively.

As a method for a terminal having RF structure Type 3 to support simultaneous transmission of NR UL and NR SL, the disclosure of the present specification suggests that the terminal independently sets the transmission timing of the NR UL signal and the transmission timing of the NR SL signal. For example, the terminal having the RF structure Type 3 determines the transmission timing of the NR UL signal based on the $N_{TA\_offset}$ and $N_{TA}$ of the currently defined NR UL, the terminal may determine the transmission timing of the NR SL signal based on $N_{TA\_offset}$ and $N_{TA,SL}$ of the NR SL. A terminal having RF structure Type 3 may start NR SL transmission at timing independent of NR UL transmission.

For power control of a terminal having RF structure Type 3, it is proposed to apply UL based power control (eg, (UL based closed-loop power control)) to UL, and to apply SL open loop power control to SL, respectively. The power control of the terminal having the RF structure Type 3 is as follows:

NR UL power: UL closed loop power control based power setting; and

NR SL power: SL open loop power control based power setting.

Then, the terminal having the RF structure Type 3 may set (or control) the power for transmitting the NR SL signal independently of the power for transmitting the NR UL signal.

An example of an open loop power control applied to a terminal having an RF structure Type 3 to transmit an NR SL signal will be described in detail as follows.

As an example, the terminal may apply open loop power control to the power for transmitting the NR SL signal using 'sl-P0-PSSCH-PSCCH' signaling information. For example, when 'sl-P0-PSSCH-PSCCH' signaling information is configured for the terminal, the terminal may determine the NR SL transmission power by applying open loop power control based on the DL pathloss and additionally the SL pathloss. When the 'sl-P0-PSSCH-PSCCH' signaling information is not configured for the terminal, the terminal does not consider the SL pathloss and may determine the NR SL transmission power by applying an open loop power control based on the DL pathloss. 'sl-P0-PSSCH-PSCCH' may mean transmission power values of PSSCH and PSCCH that the network (eg, base station) informs the terminal.

As another example, the terminal may always apply open power control to the power for transmitting the NR SL signal based on the DL pathloss. Because, considering that transmission and reception of SL signals are possible only in slots allocated to NR UL, this is because it may not be guaranteed that the terminal acquires actual SL pathloss information from a neighboring terminal using the same band.

For reference, an example of a currently defined SL power control related equation is as Equation 2 below.

$$P_{PSSCH}(i)=\min(P_{CMAX},P_{MAX,CBR},\min(P_{PSSCH,D}(i), P_{PSSCH,SL}(i)))[dBm] \quad \text{[Equation 2]}$$

In Equation 2, $P_{PSSCH,SL}(i)$ may be set as in the following example.

- if p0-SL-PSCCHPSSCH and alpha-SL-PSCCHPSSCH are provided
  - $P_{PSSCH,SL}(i) = P_{O,SL} + 10 \log_{10}(2^\mu * M^{PSSCH}(i)) + \alpha_{SL} + PL_{SL}$ [dBm]
- else
  - $P_{PSSCH}(i) = \min(P_{CMAX}, P_{PSSCH,D}(i))$ [dBm]

Here, $P_{PSSCH}(i)$ may mean NR SL transmission power. $P_{CMAX}$ may mean the maximum transmission power that can be set in the NR SL terminal. $P_{MAX,CBR}$ may mean transmission power determined in consideration of PSSCH transmission power priority and a CBR (channel busy ratio) area. $P_{PSSCH,D}(i)$ may mean transmission power determined by applying DL path loss-based power control. $P_{PSSCH,SL}(i)$ may mean transmission power determined by applying SL path loss-based power control. alphaSL-PSCCHPSSCH may mean a path loss ratio value reflected in power control. $M^{PSSCH}_{RB}(i)$ may mean the number of RBs used for PSSCH transmission. $\alpha_{SL}$ is $\alpha_{SL}$=alphaSL-PSCCHPSSCH if alphaSL-PSCCHPSSCH is provided, if alphaSL-PSCCHPSSCH is not provided, it may mean $\alpha_{SL}$=1. $PL_{SL}$ may mean path loss of SL.

For reference, in Equation 2, $PL_{SL}$ may be defined as $PL_{SL}$=referenceSignalPower—higher layer filtered RSRP. The referenceSignalPower may be obtained from PSSCH transmission power for each RE for each antenna port of the terminal. Here, referenceSignalPower may be a higher layer filtered transmission power using a filter setting (eg, a filter setting provided by filterCoeffient-SL) in PSSCH transmission occasions. The higher layer filtered RSRP may be RSRP reported from the terminal receiving the PSCCH-PSSCH transmission. A higher layer filtered RSRP may be obtained from PSSCH DM-RS using a filter setting (eg, a filter setting provided by filterCoeffient-SL).

For reference, when the terminal determines the NR SL transmission power and the NR UL transmission power, there may be a restriction on the total transmission power that is the sum of the NR SL transmission power and the NR UL transmission power. Alternatively, when the terminal determines the NR SL transmission power and the NR UL transmission power, there may be a restriction on the NR SL transmission power and a restriction on the NR UL transmission power, respectively. According to these two cases (eg, when there is a restriction on the total transmission power that is the sum of the SL transmission power and the NR UL transmission power, and when there is a restriction on the SL transmission power and a restriction on the NR UL transmission power, respectively), a method for the terminal to configure NR SL transmission power and NR UL transmission power may vary.

For example, when there are restrictions on SL transmission power and restrictions on NR UL transmission power, respectively, the terminal may determine NR SL transmission power and NR UL transmission power in the manner described above.

As another example, if there is a restriction on the total transmission power that is the sum of the SL transmission power and the NR UL transmission power, the terminal may determine the NR SL transmission power and the NR UL transmission power as in the following example. The terminal may determine the NR SL transmission power and the NR UL transmission power based on the NR UL packet priority and/or the NR SL packet priority. For reference, in the following description, the base station may transmit NR UL packet priority information and/or NR SL packet priority information to the terminal. Alternatively, the terminal may store NR UL packet priority information and/or NR SL packet priority information in advance.

Specific examples are as follows:
a) When NR UL packet priority>NR SL packet priority,
1: NR UL power setting (based on closed loop power control). The terminal may set the NR UL transmission power based on the UL closed loop power control.
2a: When Total allowed Power−NR UL Power>0, the terminal may determine the NR SL transmission power based on the following equation. For example, the terminal may set the NR SL Power as NR SL Power=min {Total allowed Power−NR UL Power, NR SL open loop controlled power}. Here, the NR SL open loop controlled power may mean the SL power determined according to the SL open loop power control based power setting described above.
2b: When Total allowed Power−NR UL Power≤0, the terminal may drop NR SL transmission.

b) When NR SL packet priority>NR UL packet priority,
   1: NR SL power setting (based on open loop power control). The terminal may set the NR SL transmission power based on the SL open loop power control.
   2a: When Total allowed Power−NR SL Power>0, the terminal may determine the NR UL transmission power based on the following equation. For example, the terminal may set the NR UL Power to NR UL Power=min (Total allowed Power−NR SL Power, NR UL closed loop controlled power). Here, the NR UL closed loop controlled power may mean the UL power determined according to the UL closed loop power control-based power setting described above.
   2b: When Total allowed Power−NR SL Power≤0, the terminal may drop NR UL transmission.
c) When NR SL packet priority=NR UL packet priority, the terminal may arbitrarily select one of the examples of a) or b) described above to determine NR SL transmission power and NR UL transmission power.
d) When both the information related to the NR SL packet priority and the information related to the NR UL packet priority are not transmitted to the terminal, or, when the terminal does not know the NR SL packet priority and the NR UL packet priority, the terminal may determine NR SL transmission power and NR UL transmission power by arbitrarily selecting one of the examples of a) or b) described above.
e) When the terminal receives only information related to NR SL packet priority and fails to receive information related to NR UL packet priority, alternatively, when the terminal has only information related to NR SL packet priority and does not have information related to NR UL packet priority, the terminal may check whether the NR SL packet priority has a priority corresponding to 'safety'. For example, when the priority value corresponding to 'safety' is '7', if the NR SL packet priority value set to PPPP (ProSe Per-Packet Priority) is equal to or greater than '7', or if the NR SL packet priority value set to PPPP is greater than or equal to '7'−Δ (e.g. Δ={1, 2, 3}), the NR SL packet priority value set to PPPP may be assumed that the priority is equivalent to 'safety'. The terminal may perform the same operation as in "b)" described above when the NR SL packet priority is a priority corresponding to 'safety'. For example, the terminal may perform an operation such as "b)" as in the following example:
   1: NR SL power setting (based on open loop power control). The terminal may set the NR SL transmission power based on the SL open loop power control.
   2a: When Total allowed Power−NR SL Power>0, the terminal may determine the NR UL transmission power based on the following equation. For example, the terminal may set the NR UL Power to NR UL Power=min {Total allowed Power−NR SL Power, NR UL closed loop controlled power). Here, the NR UL closed loop controlled power may mean the UL power determined according to the UL closed loop power control-based power setting described above.
   2b: Total allowed Power−When NR SL Power≤0, the terminal may drop NR UL transmission.

When NR SL packet priority is not a priority according to 'safety', the terminal may perform an operation such as "c)" described above (eg, the terminal may determine NR SL transmission power and NR UL transmission power by arbitrarily selecting one of the examples of a) or b) described above).

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 14 shows an example of RF structure Type 4 of a terminal according to the disclosure of the present specification.

The example of FIG. 14 shows an example of RF structure type 4 of the terminal (separated BBs (BaseBand)+separated PLL+separated PA+separated antenna). RF structure type 4 may include a separated baseband (BB), a separate PLL, a separate PA, and a separate antenna for NR UL transmission and NR SL transmission.

Since the terminal having the RF structure type 4 includes an individual phase locked loop (PLL) for each of NR UL and NR SL, the terminal can support different transmission reference times of NR UL and NR SL. That is, the terminal having the RF structure Type 4 may simultaneously perform NR UL transmission and NR SL transmission even if the transmission timing of the NR UL signal and the transmission timing of the NR SL signal are different from each other. Meanwhile, the terminal having the RF structure Type 4 may support both UL power control and SL power control due to individual power amplifiers (PAs) for NR UL and NR SL, respectively.

For reference, the terminal having the RF structure type 4 is the same as the terminal having the RF structure type 3 described with reference to the example of FIG. 13 above, the terminal may independently set the transmission timing of the NR UL signal and the transmission timing of the NR SL signal. Similarly, the terminal having the RF structure type 4 is the same as the terminal having the RF structure type 3 described above with reference to the example of FIG. 13, the terminal may determine power for transmitting the NR SL signal and power for transmitting the NR UL signal.

As a method for a terminal having RF structure Type 4 to support simultaneous transmission of NR UL and NR SL, the disclosure of the present specification proposes that the terminal independently sets the transmission timing of the NR UL signal and the transmission timing of the NR SL signal. For example, the terminal having the RF structure Type 4 determines the transmission timing of the NR UL signal based on the $N_{TA\_offset}$ and $N_{TA}$ of the currently defined NR UL, the terminal may determine the transmission timing of the NR SL signal based on $N_{TA\_offset}$ and $N_{TA,SL}$ of the NR SL. A terminal having RF structure Type 4 may start NR SL transmission at timing independent of NR UL transmission.

For power control of a terminal having RF structure Type 4, it is proposed to apply UL standard power control (eg, (UL based closed-loop power control)) to UL and to apply SL open loop power control to SL, respectively. The power control of the terminal having the RF structure Type 4 is as follows:
  NR UL power: UL closed loop power control based power setting; and
  NR SL power: SL open loop power control based power setting.

Then, the terminal having the RF structure Type 4 may set (or control) the power for transmitting the NR SL signal independently of the power for transmitting the NR UL signal.

An example of an open loop power control applied to a terminal having an RF structure Type 4 to transmit an NR SL signal will be described in detail as follows.

As an example, the terminal may apply open loop power control to the power for transmitting the NR SL signal using 'sl-P0-PSSCH-PSCCH' signaling information. For example, when 'sl-P0-PSSCH-PSCCH' signaling information is configured to the terminal, the terminal may determine the NR SL transmission power by applying open loop power control based on the DL pathloss and additionally the SL pathloss. If the 'sl-P0-PSSCH-PSCCH' signaling information is not configured for the terminal, the terminal does not consider the SL pathloss, the terminal may determine the NR SL transmission power by applying open loop power control based on the DL pathloss.

As another example, the terminal may always apply open power control to the power for transmitting the NR SL signal based on the DL pathloss. Because, considering that transmission and reception of SL signals are possible only in slots allocated to NR UL, this is because it may not be guaranteed that the terminal acquires actual SL pathloss information from a neighboring terminal using the same band.

For reference, an example of the currently defined SL power control related equation is the same as Equation 2 described above.

For reference, when the terminal determines the NR SL transmission power and the NR UL transmission power, there may be a restriction on the total transmission power that is the sum of the NR SL transmission power and the NR UL transmission power. Alternatively, when the terminal determines the NR SL transmission power and the NR UL transmission power, there may be a restriction on the NR SL transmission power and a restriction on the NR UL transmission power, respectively. According to these two cases (eg, when there is a restriction on the total transmission power that is the sum of the SL transmission power and the NR UL transmission power, and when there is a restriction on the SL transmission power and a restriction on the NR UL transmission power, respectively), a method for the terminal to configure NR SL transmission power and NR UL transmission power may vary.

For example, when there are restrictions on SL transmission power and restrictions on NR UL transmission power, respectively, the terminal may determine NR SL transmission power and NR UL transmission power in the manner described above.

As another example, if there is a restriction on the total transmission power that is the sum of the SL transmission power and the NR UL transmission power, the terminal may determine the NR SL transmission power and the NR UL transmission power as in the following example. The terminal may determine the NR SL transmission power and the NR UL transmission power based on the NR UL packet priority and/or the NR SL packet priority.

Specific examples are as follows:
a) When NR UL packet priority>NR SL packet priority,
  1: NR UL power setting (based on closed loop power control). The terminal may set the NR UL transmission power based on the UL closed loop power control.
  2a: When Total allowed Power−NR UL Power>0, the terminal may determine the NR SL transmission power based on the following equation. For example, the terminal may set the NR SL Power as NR SL Power=min {Total allowed Power−NR UL Power, NR SL open loop controlled power}. Here, the NR SL open loop controlled power may mean the SL power determined according to the SL open loop power control based power setting described above.
  2b: When Total allowed Power−NR UL Power≤0, the terminal may drop NR SL transmission.
b) When NR SL packet priority>NR UL packet priority,
  1: NR SL power setting (based on open loop power control). The terminal may set the NR SL transmission power based on the SL open loop power control.
  2a: When Total allowed Power−NR SL Power>0, the terminal may determine the NR UL transmission power based on the following equation. For example, the terminal may set the NR UL Power to NR UL Power=min {Total allowed Power−NR SL Power, NR UL closed loop controlled power). Here, the NR UL closed loop controlled power may mean the UL power determined according to the UL closed loop power control-based power setting described above.
  2b: Total allowed Power−When NR SL Power≤0, the terminal may drop NR UL transmission.
c) When NR SL packet priority=NR UL packet priority, the terminal may arbitrarily select one of the examples of a) or b) described above to determine NR SL transmission power and NR UL transmission power.
d) When both the information related to the NR SL packet priority and the information related to the NR UL packet priority are not transmitted to the terminal, or, when the terminal does not know the NR SL packet priority and the NR UL packet priority, the terminal may determine NR SL transmission power and NR UL transmission power by arbitrarily selecting one of the examples of a) or b) described above.
e) When the terminal receives only information related to NR SL packet priority and fails to receive information related to NR UL packet priority, alternatively, when the terminal has only information related to NR SL packet priority and does not have information related to NR UL packet priority, the terminal may check whether the NR SL packet priority has a priority corresponding to 'safety'. The terminal may perform the same operation as in "b)" described above when the NR SL packet priority is a priority corresponding to 'safety'. For example, when the priority value corresponding to 'safety' is '7', if the NR SL packet priority value set to PPPP (ProSe Per-Packet Priority) is equal to or greater than '7', or if the NR SL packet priority value set to PPPP is greater than or equal to '7'−Δ (e.g. Δ={1, 2, 3}), the NR SL packet priority value set to PPPP may be assumed that the priority is equivalent to 'safety'. For example, the terminal may perform an operation such as "b)" as in the following example:
  1: NR SL power setting (based on open loop power control). The terminal may set the NR SL transmission power based on the SL open loop power control.
  2a: When Total allowed Power−NR SL Power>0, the terminal may determine the NR UL transmission power based on the following equation. For example, the terminal may set the NR UL Power to NR UL Power=min (Total allowed Power−NR SL Power, NR UL closed loop controlled power). Here, the NR UL closed loop controlled power may mean the UL power determined according to the UL closed loop power control-based power setting described above.
  2b: Total allowed Power−When NR SL Power≤0, the terminal may drop NR UL transmission.

When NR SL packet priority is not a priority according to 'safety', the terminal may perform an operation such as "c)" described above (eg, the terminal may determine NR SL transmission power and NR UL transmission power by arbitrarily selecting one of the examples of a) or b) described above).

RF structure Type 4 of the terminal includes a separate antenna for NR UL transmission and NR SL transmission. Compared with the RF structure Type 3 including a single antenna, the RF structure Type 4 of the terminal may have a small reverse intermodulation impact that may occur due to simultaneous transmission of the NR UL signal and the NR SL signal. Here, the reverse intermodulation impact may be a shape occurring in an RF structure having two PAs. For example, when an NR UL signal flows through a PA for NR UL and into a PA for NR SL, reverse intermodulation impact may occur. Taking the opposite case as an example, when the NR SL signal flows through the PA for the NR SL and flows into the PA for the NR UL, a reverse intermodulation impact may occur. Compared with the RF structure Type 3 including a single antenna, the Type 4 may have a smaller reverse intermodulation impact than the RF structure Type 3 because the isolation between antennas (eg, 10 dB isolation) is additionally considered. For this reason, MPR (Maximum Output Power Reduction) and/or A-MPR (Additional Maximum Output Power Reduction) applied to the RF structure Type 4 of the terminal may be set smaller than the MPR and/or A-MPR applied to the RF structure Type 1 to Type 3 of the terminal.

As described above with reference to the examples of FIGS. 11 to 14, the terminal may determine the NR UL transmission timing and the NR SL transmission timing differently according to the RF structure Type 1 to Type 4 of the terminal. In addition, according to the RF structure Type 1 to Type 4 of the terminal, the terminal may set (or determine) the NR UL transmission power and the NR SL transmission power differently. In addition, depending on the components included in the RF structure of the terminal (eg, single PLL, separate PLL, single PA, separate PA, single antenna, separate antenna, etc.), the terminal may determine the NR UL transmission timing and the NR SL transmission timing differently. In addition, depending on the components included in the RF structure of the terminal (eg, single PLL, separate PLL, single PA, separate PA, single antenna, separate antenna, etc.), the terminal may set (or determine) the NR UL transmission power and the NR SL transmission power differently.

Accordingly, it may be necessary to distinguish between terminals capable of simultaneously transmitting the NR UL signal and the NR SL signal. For example, it may be necessary to distinguish whether the terminal corresponds to which type of RF structure Type 1 to Type 4. For another example, it may be necessary to distinguish components (eg, single PLL, separate PLL, single PA, separate PA, single antenna, separate antenna, etc.) included in the RF structure of the terminal.

For this classification, signaling for capability and capability of the terminal may be defined.

For example, capability and capability signaling for distinguishing each of RF structure Type1, RF structure Type2, RF structure Type3, and RF structure Type4 may be proposed.

Alternatively, capability and capability signaling for distinguishing between RF structure Type1 and RF structure Type 2/3/4 may be proposed. For example, the terminal having the RF structure Type 1 sets the transmission timing of the NR SL signal to be the same as the transmission timing of the NR UL signal. On the other hand, terminals having RF structures Type 2 to Type 4 may independently set the transmission timing of the NR UL signal and the transmission timing of the NR SL signal. Therefore, in order to distinguish the RF structure Type 1 from the remaining RF structure Types (Type 2 to Type 4), capacity and capability signaling may be defined.

Alternatively, in order to distinguish the components (eg, single PLL, separated PLL, single PA, separated PA, single antenna, separated antenna, etc.) included in the RF structure of the terminal, capacity and capability signaling may be defined. For example, it is possible to define an individual (or separate) time support capability (eg, whether it includes a separate PLL), an individual (or separate) PA support capability, and an individual (or separate) antenna support capability. For reference, these capabilities and capability signaling may be defined independently of each other. Alternatively, each capability and capability signaling may be defined in a combination form.

Figure 15:
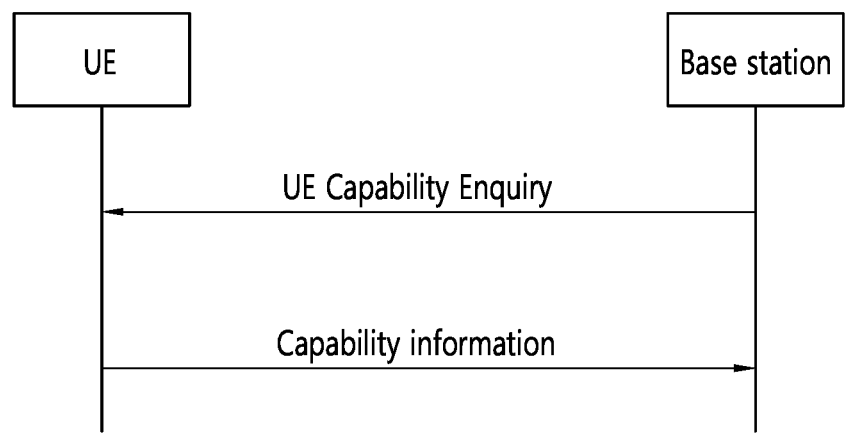
FIG. 15 shows an example of capability signaling according to the disclosure of this specification.

Hereinafter, the example of FIG. 15 shows an example in which the terminal transmits capability information to the base station.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 15 shows an example of capability signaling according to the disclosure of this specification.

Referring to FIG. 15, an example of capability signaling according to the disclosure of this specification is shown. The example of the capability signaling of FIG. 15 is merely exemplary. The scope of the disclosure of the present specification may include any signaling capable of indicating capability for distinguishing the RF structure type of the terminal, as in the example described above. The scope of the disclosure of the present specification is, as in the example described above, may include any signaling that can inform the capability for distinguishing components (eg, single PLL, separate PLL, single PA, separated PA, single antenna, separate antenna, etc.) included in the RF structure of the terminal.

A base station (eg, gNB or eNB, etc.) may transmit a terminal capability inquiry message to a terminal (eg, terminal). The terminal capability inquiry message transmitted by the base station may be a message for inquiring which RF structure type the terminal includes or which components are included in the RF structure of the terminal.

The terminal may transmit capability information to the base station. The capability information may include capability information for distinguishing each of the RF structure Type1, RF structure Type2, RF structure Type3, and RF structure Type4. The capability information may include capability information for distinguishing between RF structure Type1 and RF structure Type 2/3/4. The capability information may include capability information for distinguishing components (eg, single PLL, split PLL, single PA, split PA, single antenna, split antenna, etc.) included in the RF structure of the terminal. When the terminal capability inquiry message is received, the terminal may transmit capability information to the base station. Alternatively, the step of the base station transmitting the terminal capability inquiry message may be omitted, and the terminal may transmit the capability information to the base station even if the terminal capability inquiry message is not received.

After the terminal transmits capability information for classifying the RF structure type of the terminal to the network (eg, the base station), a network (eg, a base station)

may perform the following scheduling operation according to capability information. Here, the capability information for distinguishing the RF structure Type of the terminal may be capability information for distinguishing each of the RF structure Type1, RF structure Type2, RF structure Type3, and RF structure Type4. Alternatively, the capability information for distinguishing the RF structure Type of the terminal may be capability information for distinguishing the RF structure Type1 and the RF structure Type 2/3/4. For example, a terminal and/or a network (eg, a base station) may perform an operation described below.

When the terminal is a terminal having RF structure Type 1, the network and/or the terminal may perform an operation as in the following example:
  a-1) The network may set the NR SL reference timing (eg, synchronization reference source) of the terminal to the gNB. And, the network and/or the terminal may synchronize the NR SL transmission timing with the NR UL Tx timing.
  a-2) If the network sets the NR SL reference timing (eg, synchronization reference source) of the terminal to Global navigation satellite systems (GNSS) or a neighboring NR SL terminal, the following operations may be performed:
    The network may set the priority of the NR UL to be higher than that of the NR SL. By setting the priority of NR UL higher than that of NR SL, the terminal may perform NR SL transmission according to the NR UL Tx timing regardless of the NR SL reference timing. Alternatively, when the NR UL priority is set higher than the NR SL priority, the terminal may drop the NR SL transmission.
    The network may set the priority of the NR SL to be higher than the priority of the NR UL. In this case, the terminal may perform NR SL transmission based on reference timing and drop NR UL transmission.
  b) The terminal may equally apply UL Power Control to Power Control for NR SL. For example, the terminal may set (or control) the power for transmitting the NR SL signal to be the same as the power for transmitting the NR UL signal.

When the terminal is a terminal having RF structure Type 2, the network and/or the terminal may perform an operation as in the following example:
  a) The network may set the NR SL reference timing (eg, synchronization reference source) of the terminal to one of gNB, GNSS, or adjacent NR SL terminal. And, the network and/or the terminal may independently set the NR SL transmission timing and the NR UL Tx timing.
  b) The terminal may equally apply UL Power Control to Power Control for NR SL. For example, the terminal may set (or control) the power for transmitting the NR SL signal to be the same as the power for transmitting the NR UL signal. When the NR UL transmission timing and the NR SL transmission timing of the terminal are out of synchronization, the network may set the NR UL priority and the NR SL priority for power control. The network may inform the terminal of the priority of the NR UL and the priority of the NR SL. When the priority of the NR UL and the priority of the NR SL are set, the terminal may perform power control for the NR SL as in the following example:
    When the priority of the NR UL is higher than the priority of the NR SL, the terminal may set (or control) the power for transmitting the NR SL signal to the same as the power for transmitting the NR UL signal based on the NR UL slot boundary.
    When the priority of the NR SL is higher than that of the NR UL, the terminal may set (or control) the power for transmitting the NR SL signal to the same as the power for transmitting the NR UL signal based on the NR SL slot boundary.
    When the priority of NR UL is the same as that of NR SL, the terminal may set (or control) the power for transmitting the NR SL signal to be the same as the power for transmitting the NR UL signal based on the NR UL slot boundary.
    If the priority is not set, the terminal may set (or control) the power to transmit the NR SL signal to the power to transmit the NR UL signal based on the NR UL slot boundary.

When the terminal is a terminal having RF structure Type 3, the network and/or the terminal may perform an operation as in the following example:
  a) The network may set the NR SL reference timing (eg, synchronization reference source) of the terminal to one of gNB, GNSS, or adjacent NR SL terminal. And, the network and/or the terminal may independently set the NR SL transmission timing and the NR UL Tx timing.
  b) The terminal may set (or control) the power for transmitting the NR SL signal independently of the power for transmitting the NR UL signal. Alternatively, as described above in the example of FIG. 14, The terminal may perform NR SL power control.

When the terminal is a terminal having an RF structure Type 4, the network and/or the terminal may perform an operation as in the following example:
  a) The network may set the NR SL reference timing (eg, synchronization reference source) of the terminal to one of gNB, GNSS, or adjacent NR SL terminal. And, the network and/or the terminal may independently set the NR SL transmission timing and the NR UL Tx timing.
  b) The terminal may set (or control) the power for transmitting the NR SL signal independently of the power for transmitting the NR UL signal. Alternatively, as described above in the example of FIG. 15, NR SL power control may be performed.

After the terminal transmits capability information to the network (eg, the base station) to distinguish the components (eg, single PLL, separated PLL, single PA, separated PA, single antenna, separated antenna, etc.) included in the terminal's RF structure, a network (eg, a base station) may perform the following scheduling operation according to capability information. Here, the capability information may include an individual (or separate) time support capability (eg, whether it includes a separate PLL), an individual (or separate) PA support capability, and an individual (or separate) antenna support capability.

When the terminal transmits individual (or separate) time support capability (eg, whether it includes a separate PLL) information to the network, the network and/or the terminal may perform operations such as the following examples:
  a) When the terminal supports separate synchronization of the NR UL transmission timing and the NR SL transmission timing (eg, when the terminal can set the NR UL transmission timing and the NR SL transmission timing independently), the network may schedule NR UL and NR SL based on individual synchronization. In addition, the network may configure the gNB, GNSS, or adjacent NR SL terminal as an NR SL timing reference (eg, a synchronization reference source).

b-1) When the terminal does not support separate synchronization of the NR UL transmission timing and the NR SL transmission timing (eg, when the terminal synchronizes the NR SL transmission timing to the NR UL transmission timing), the network may set the NR SL reference timing to gNB and synchronize the NR SL transmission with the NR UL Tx timing.

b-2) When the terminal does not support separate synchronization of the NR UL transmission timing and the NR SL transmission timing (eg, when the terminal synchronizes the NR SL transmission timing to the NR UL transmission timing), the network may configure the GNSS or adjacent NR SL terminal as the NR SL reference timing. in this case:

The network may set the priority of the NR UL higher than the priority of the NR SL. By setting the priority of NR UL higher than that of NR SL, the terminal may perform NR SL transmission according to the NR UL Tx timing regardless of the NR SL reference timing. Alternatively, the terminal may drop the NR SL transmission.

The network may set the priority of the NR SL to be higher than the priority of the NR UL. In this case, the terminal may perform NR SL transmission based on reference timing and drop NR UL transmission.

When the terminal transmits individual (or separated) PA support capability information to the network, the network and/or the terminal may perform an operation as in the following example:

a) When the terminal supports an individual (or separate) PA for each of NR UL and NR SL, the terminal may separately perform UL Power control and SL Power control. For example, the terminal may set (or control) the power for transmitting the NR SL signal independently of the power for transmitting the NR UL signal.

b) If the terminal does not support individual (or separate) PAs for each of NR UL and NR SL, the terminal may equally apply UL power control to SL power control. For example, the terminal may perform SL power control as described above in the example of FIG. 13 and the example of FIG. 14.

When the terminal transmits individual (or separate) antenna support capability information to the network, the network and/or the terminal may perform an operation as in the following example:

a) When the terminal supports an individual (or separate) antenna for each of NR UL and NR SL, the terminal may separately perform UL Power control and SL Power control. For example, the terminal may set (or control) the power for transmitting the NR SL signal independently of the power for transmitting the NR UL signal.

b) If the terminal does not support individual (or separate) antennas for each of NR UL and NR SL, the terminal may equally apply UL power control to SL power control. For example, the terminal may perform SL power control, as described above in the example of FIG. 14.

When the terminal transmits individual (or separated) time support capability (eg, whether it includes a separate PLL) information and individual (or separated) PA support capability information to the network, the network and/or the terminal may perform operations such as the following examples:

1) the terminal supports individual synchronization of the NR UL transmission timing and the NR SL transmission timing (eg, when the terminal can independently set the NR UL transmission timing and the NR SL transmission timing), when the terminal supports individual (or separate) PAs for each of NR UL and NR SL, the network and/or the terminal may perform an operation as in the following example. For reference, in this case, the network and/or the terminal may perform the same operation as when the terminal has RF structure Type 3 or RF structure Type 4:

1-a) The network may set the NR SL reference timing (eg, synchronization reference source) of the terminal to one of gNB, GNSS, or adjacent NR SL terminal. And, the network and/or the terminal may independently set the NR SL transmission timing and the NR UL Tx timing.

1-b) The terminal may set (or control) the power for transmitting the NR SL signal independently of the power for transmitting the NR UL signal. Alternatively, as previously described in the example of FIG. 13 or FIG. 14, the terminal may perform NR SL power control.

2) If the terminal supports individual synchronization of the NR UL transmission timing and the NR SL transmission timing (eg, when the terminal can independently set the NR UL transmission timing and the NR SL transmission timing), and if the terminal does not support individual (or separate) PAs for each of NR UL and NR SL, the network and/or the terminal may perform an operation as in the following example. For reference, in this case, the network and/or the terminal may perform the same operation as when the terminal has the RF structure Type 2:

2-a) The network may set the NR SL reference timing (eg, synchronization reference source) of the terminal to one of gNB, GLASS, or adjacent NR SL terminal. And, the network and/or the terminal may independently set the NR SL transmission timing and the NR UL Tx timing.

2-b) The terminal may equally apply UL Power Control to Power Control for NR SL. For example, the terminal may set (or control) the power for transmitting the NR SL signal to be the same as the power for transmitting the NR UL signal. When the NR UL transmission timing and the NR SL transmission timing of the terminal are out of synchronization, the network may set the NR UL priority and the NR SL priority for power control. The network may inform the terminal of the priority of the NR UL and the priority of the NR SL. When the priority of the NR UL and the priority of the NR SL are set, the terminal may perform power control for the NR SL as in the following example:

When the priority of the NR UL is higher than the priority of the NR SL, the terminal may set (or control) the power for transmitting the NR SL signal to the same as the power for transmitting the NR UL signal based on the NR UL slot boundary.

When the priority of the NR SL is higher than that of the NR UL, the terminal may set (or control) the power for transmitting the NR SL signal to the same as the power for transmitting the NR UL signal based on the NR SL slot boundary.

When the priority of NR UL is the same as that of NR SL, the terminal may set (or control) the power for transmitting the NR SL signal to be the same as the power for transmitting the NR UL signal based on the NR UL slot boundary.

If the priority is not set, the terminal may set (or control) the power to transmit the NR SL signal to the power to transmit the NR UL signal based on the NR UL slot boundary.

2) If the terminal does not support individual synchronization of the NR UL transmission timing and the NR SL transmission timing (eg, when the terminal cannot independently set the NR UL transmission timing and the NR SL transmission timing), and the terminal does not support individual (or separate) PAs for each of NR UL and NR SL, the network and/or the terminal may perform an operation as in the following example. For reference, in this case, the network and/or the terminal may perform the same operation as when the terminal has RF structure Type 1:

3-a-1) The network may set the NR SL reference timing (eg, synchronization reference source) of the terminal to the gNB. And, the network and/or the terminal may synchronize the NR SL transmission timing with the NR UL Tx timing.

3-a-2) If the network sets the NR SL reference timing (eg, synchronization reference source) of the terminal to GNSS or a neighboring NR SL terminal, the following operations may be performed:

The network may set the priority of the NR UL to be higher than that of the NR SL. By setting the priority of NR UL higher than that of NR SL, the terminal may perform NR SL transmission according to the NR UL Tx timing regardless of the NR SL reference timing. Alternatively, when the NR UL priority is set higher than the NR SL priority, the terminal may drop the NR SL transmission.

The network may set the priority of the NR SL to be higher than the priority of the NR UL. In this case, the terminal may perform NR SL transmission based on reference timing and drop NR UL transmission.

3-b) The terminal may equally apply UL Power Control to Power Control for NR SL. For example, the terminal may set (or control) the power for transmitting the NR SL signal to be the same as the power for transmitting the NR UL signal.

When the terminal transmits individual (or separated) time support capability (eg, whether it includes a separate PLL) information and individual (or separated) antenna support capability information to the network, the network and/or the terminal may perform operations such as the following examples:

1) If the terminal supports individual synchronization of the NR UL transmission timing and the NR SL transmission timing (eg, when the terminal can independently set the NR UL transmission timing and the NR SL transmission timing), and if the terminal supports individual (or separate) antennas for each of NR UL and NR SL, the network and/or the terminal may perform the same operation (eg, the same operation as when the aforementioned terminal supports individual (or separate) PAs for each of NR UL and NR SL) as when the terminal has RF structure Type 4:

2) If the terminal supports individual synchronization of the NR UL transmission timing and the NR SL transmission timing (eg, when the terminal can independently set the NR UL transmission timing and the NR SL transmission timing), and if the terminal does not support individual (or separate) antennas for each of NR UL and NR SL, the network and/or terminal may perform same operation as in the case of RF structure Type 2 (eg, when the terminal described above does not support individual (or separate) PAs for each of NR UL and NR SL) or same operation as in the case with Type 3 (eg, when the aforementioned terminal supports an individual (or separate) PA for each of NR UL and NR SL).

3) If the terminal does not support individual synchronization of the NR UL transmission timing and the NR SL transmission timing (eg, when the terminal cannot independently set the NR UL transmission timing and the NR SL transmission timing), and if the terminal does not support individual (or separate) antennas for each of NR UL and NR SL, the network and/or terminal may perform the same operation as in the case of having RF structure Type 1 (eg, when the above-described terminal does not support an individual (or separate) PA for each of NR UL and NR SL).

On the other hand, since the SL time synchronization is not the same as the transmission of the SL signal of the terminal supporting the RF structure Type2/3/4 for the transmission of the SL signal of the terminal supporting the RF structure Type1, SL communication between a terminal supporting RF structure Type 1 and a terminal supporting RF structure Type 2/3/4 may not be possible. On the other hand, a terminal supporting RF structure Type 2, a terminal supporting RF structure Type 3, and a terminal supporting RF structure Type 4 may have the same SL time synchronization. Accordingly, SL communication between a terminal supporting RF structure Type 2, a terminal supporting RF structure Type 3, and a terminal supporting RF structure Type 4 may not be restricted. As such, there may be restrictions in SL communication between a terminal supporting RF structure Type 1 and a terminal supporting RF structure Type 2/3/4. In order to solve such limited SL communication, the disclosure of the present specification proposes a method such as the following example:

a) The disclosure of the present specification proposes a method of excluding a terminal supporting RF structure Type1 from a terminal performing SL communication. Then, there is no restriction on SL communication between a terminal supporting RF structure Type 2, a terminal supporting RF structure Type 3, and a terminal supporting RF structure Type 4, SL communication between terminals supporting various RF structure types can be effectively performed.

b) A method for unifying timing application standards (eg, $N_{TA\_offset}$, $N_{SL,TA}$) for SL communication in a licensed band is proposed. For example, for all of a terminal supporting RF structure Type1, a terminal supporting RF structure Type2, a terminal supporting RF structure Type3, and a terminal supporting RF structure Type4, $N_{TA\_offset}$ and $N_{SL,TA}$ of the same value can be applied. And, in the disclosure of this specification, the terminal sets the gNB of the licensed band with the highest priority NR SL reference timing (eg, synchronization reference source), and proposes to apply $N_{TA\_offset}$ and $N_{SL,TA}$ of the same value. For example, the priority of NR SL reference timing (eg, synchronization reference source) may be applied as "gNB>SyncRefUE based on gNB synchronization source directly>SyncRefUE based on gNB synchronization source in-directly>GNSS>SyncRefUE based on GNSS synchronization source directly>SyncRefUE based on GNSS synchronization source in-directly>SyncRefUE that has lowest priority". In the case where the terminal simultaneously transmits the NR UL signal and the NR SL signal in the licensed band, SL communication between a UE whose NR SL reference timing (eg, synchronization reference source) is GNSS and a reference source (gNB or SyncRefUE) whose NR SL reference timing (eg, synchronization reference source) is different may not be guaranteed. As an example, UE1 may transmit with gNB timing, and UE2 may receive with GNSS timing. In this case, if the signal of the terminal UE1 is received outside the CP length based on the reception timing reference of the terminal UE2, the terminal UE2 may not be able to detect the signal of the UE1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
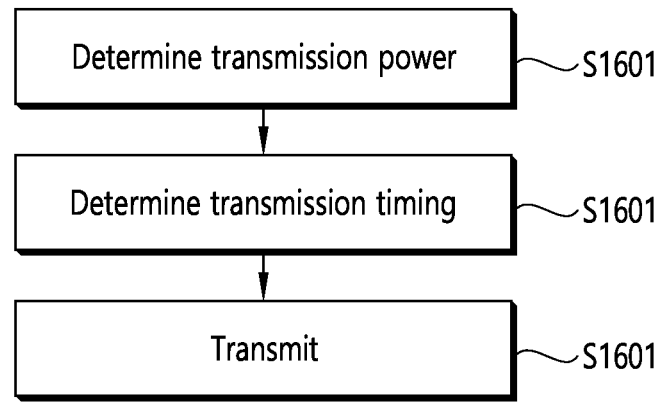
FIG. 16 shows an example of operation of a terminal according to an embodiment of the disclosure of the present specification.

FIG. 16 shows an example of operation of a terminal according to an embodiment of the disclosure of the present specification.

The operation of the terminal shown in FIG. 16 is only an example, and the scope of the disclosure of the present specification is not limited by the content shown in FIG. 16. For example, the terminal may perform an operation not shown in FIG. 16. As an example, the terminal may perform the operations described above in various examples of the disclosure of the present specification.

In the example of FIG. 16, the terminal may be a terminal capable of simultaneously performing the transmission of the NR signal and the transmission of the SL signal.

In step S1601, the terminal may determine the transmission power. For example, the UE may determine transmission power for SL transmission based on capability information. Also, the UE may determine transmission power for UL transmission. The UE may determine transmission power for UL transmission based on capability information. The UE may determine the transmission power for SL transmission in a different way according to the capability information. For specific operations of the terminal, refer to the operation of determining the transmission power for SL transmission and/or the transmission power for UL transmission of the terminal described through various examples above.

Here, the capability information may be capability information related to SL transmission and the UL transmission. For example, the capability information may be the capability information described above through various examples. For example, the capability information may include capability information related to RF structure Type1, RF structure Type2, RF structure Type3, and RF structure Type4. For example, the capability information may include (i) information on whether the transmission timing for the SL transmission and the transmission timing for the UL transmission can be independently determined, (ii) whether it is possible to independently determine the transmission power for the SL transmission and the transmission power for the UL transmission, and/or (iii) information on whether separate antennas are supported for the SL transmission and the UL transmission.

For reference, the terminal may transmit capability information to the base station. For example, as in the example of FIG. 15 described above, the terminal may transmit capability information to the base station. For example, as in step S1701 of FIG. 17 to be described later), the terminal may transmit capability information to the base station. The terminal may receive configuration information (eg, information used to set the transmission power of the terminal and/or information used to set the transmission timing of the terminal) from the base station. The base station may transmit configuration information to the terminal based on the capability information of the terminal. For a specific example in which the base station transmits configuration information to the terminal, reference will be made to the description of step S1702 of FIG. 17 to be described later.

In step S1602, the terminal may determine the transmission timing. For example, the terminal may determine a transmission timing for SL transmission based on the capability information. Also, the UE may determine a transmission timing for UL transmission. For example, the UE may determine a transmission timing for UL transmission based on the capability information. The UE may determine the transmission timing for SL transmission in a different way according to the capability information. For specific operations of the terminal, refer to the operation of determining the transmission timing for SL transmission and/or UL transmission of the terminal described through various examples above.

In step S1603, the terminal may transmit a signal. The terminal may determine the signal based on the transmission power determined in step S1601 and the transmission timing determined in step S1602. For example, the UE may transmit an SL signal and a UL signal.

For specific operations of the terminal, refer to the operation of determining the transmission power for SL transmission and/or the transmission power for UL transmission of the terminal described through various examples above.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 17:
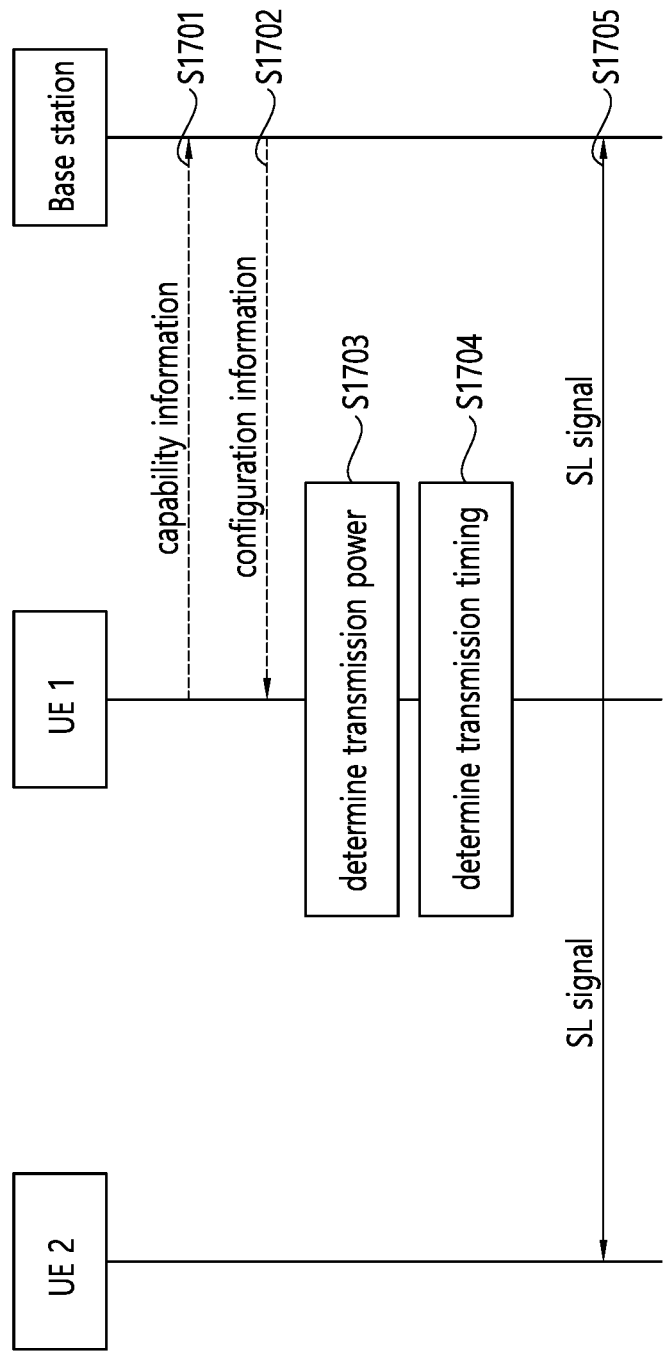
FIG. 17 shows an example of operations of a terminal and a base station according to an embodiment of the disclosure of the present specification.

FIG. 17 shows an example of operations of a terminal and a base station according to an embodiment of the disclosure of the present specification.

The operation of the terminal shown in FIG. 17 is only an example, and the scope of the disclosure of the present specification is not limited by the content shown in FIG. 17. For example, the terminal may perform an operation not shown in FIG. 17. As an example, the terminal may perform the operations of the terminal described above in various examples of the disclosure of the present specification. For example, the base station may perform an operation not shown in FIG. 17. For example, the base station may perform the operation of the network (eg, the base station) described in various examples of the disclosure of the present specification.

In the example of FIG. 17, a terminal (eg, UE 1) may be a terminal capable of simultaneously performing transmission of an NR signal and transmission of an SL signal.

In step S1701, the terminal may transmit capability information to the base station. The capability information refers to the capability information described in various examples of the disclosure of the present specification. For example, the capability information may include capability information related to RF structure Type1, RF structure Type2, RF structure Type3, and RF structure Type4. For example, the capability information may include (i) information on whether the transmission timing for the SL transmission and the transmission timing for the UL transmission can be independently determined, (ii) whether it is possible to independently determine the transmission power for the SL transmission and the transmission power for the UL transmission, and/or (iii) information on whether separate antennas are supported for the SL transmission and the UL transmission.

In step S1702, the base station may transmit configuration information to the terminal. Here, the configuration information may be information generated based on the capability information transmitted by the terminal. For example, the configuration information may include information used to set the transmission power of the terminal and/or information used to set the transmission timing of the terminal. For example, the configuration information may include information used to set the transmission power and/or information used to set the transmission timing of the terminal in the various examples described above with reference to FIGS. 11 to 16.

For reference, steps S1701 and S1702 may be selectively performed. For example, steps S1701 and S1702 may not be performed. As another example, step S1701 may be performed and step S1702 may not be performed. In another example, step S1702 may be performed and step S1701 may not be performed.

In step S1703, the terminal may determine the transmission power. Step S1703 may be performed in the same manner as step S1601 of FIG. 16. For reference, when step S1702 is performed, the terminal may determine the transmission power based on the capability information and/or configuration information.

In step S1704, the terminal may determine the transmission timing. Step S1703 may be performed in the same manner as step S1602 of FIG. 16. For reference, when step S1702 is performed, the terminal may determine the transmission timing based on the capability information and/or configuration information.

In step S1705, the terminal may transmit a signal. The terminal may determine the SL signal and the UL signal based on the transmission power determined in step S1703 and the transmission timing determined in step S1704.

As described in the disclosure of the present specification, the terminal can efficiently perform sidelink (or V2X) communication and/or NR Uu communication. For example, in the disclosure of the present specification, various examples of RF structure types of a terminal capable of simultaneously performing NR SL signal transmission and NR UL signal transmission have been defined. Accordingly, according to the RF structure type of the terminal, the terminal and/or the base station may enable the terminal to efficiently perform sidelink (or V2X) communication and/or NR Uu communication. In addition, by transmitting capability information related to SL transmission and UL transmission to the base station, the base station can check the RF structure type of the terminal and/or the capability of the terminal. The base station may provide configuration information (eg, scheduling information, information related to transmission power of the terminal, etc.) to the terminal based on the capability information of the terminal. Through this, the terminal can efficiently perform sidelink (or V2X) communication and/or NR Uu communication. A network (eg, a base station) and/or a terminal may enable the terminal to effectively determine a transmission power for SL transmission and a transmission timing for SL transmission.

For reference, the operation of the UE described in the present disclosure may be performed by the device shown in FIG. 1 to FIG. 3. For example, the UE may be the first wireless device 100 or the second wireless device 200 shown in FIG. 1. For example, the operation of the UE described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the UE described in the present disclosure by executing the instruction/program stored in the one or more memories 104 or 204.

Furthermore, the instructions for performing the operation of the UE described in the present disclosure may be stored in a non-volatile computer readable storage medium. The storage medium may be included in the one or more memories 104 or 204. In addition, the instructions stored in the storage medium may be executed by the one or more processors 102 or 202, and the operation of the UE described in the present disclosure may be performed.

For reference, the operation of the BS (e.g., NG-RAN, gNB, gNB (NB-IoT), gNB (NR) eNB, RAN, etc.) described in the present disclosure may be implemented by the device shown in FIG. 1 to FIG. 3. For example, the BS (e.g., NG-RAN, gNB, gNB (NB-IoT), gNB (NR) eNB, RAN, etc.) may be the first wireless device 100a or the second wireless device 100b shown in FIG. 1. For example, the operation of the BS (e.g., NG-RAN, gNB, gNB (NB-IoT), gNB (NR) eNB, RAN, etc.) described in the present disclosure may be processed by one or more processors 102 or 202. The operation of the UE described in the present disclosure may be stored in one or more memories 104 or 204 in the form of instruction/program (e.g., instruction, executable code, etc.) executable by the one or more processors 102 or 202. The one or more processors 102 or 202 may control the one or more memories 104 or 204 and the one or more transceivers 105 or 206 and may perform the operation of the BS (e.g., NG-RAN, gNB, gNB (NB-IoT), gNB (NR) eNB, RAN, etc.) described in the present disclosure by executing the instruction/program stored in the one or more memories 104 or 204.

Furthermore, the instructions for performing the operation of the BS (e.g., NG-RAN, gNB, gNB (NB-IoT), gNB (NR) eNB, RAN, etc.) described in the present disclosure may be stored in a non-volatile (or non-transitory) computer readable storage medium. The storage medium may be included in the one or more memories 104 or 204. In addition, the instructions stored in the storage medium may be executed by the one or more processors 102 or 202, and the operation of the BS (e.g., NG-RAN, gNB, gNB (NB-IoT), gNB (NR) eNB, RAN, etc.) described in the present disclosure may be performed.

So far, the preferred embodiment has been described in an exemplary manner. However, the disclosure of the present specification is not limited to the specific embodiment and may be modified, altered, or improved in various forms within the inventive concept and the scope written in the claims of the present disclosure.

In the exemplary system described above, the methods are described based on a flowchart as a series of steps or blocks. However, the methods are not limited to the order of the steps described above, and a certain step may be performed in a different order or performed simultaneously. Furthermore, it is understood that the steps shown in the flowchart are not mutually exclusive, but another step may be included, or one or more steps may be deleted without influencing the scope to those ordinary skilled in the art.

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication, the method performed by a user equipment (UE) and comprising:
    determining transmission power for SL transmission based on capability information of the UE,
    wherein the capability information of the UE is information related to a capability of the UE related to the SL transmission and uplink (UL) transmission;
    determining a transmission timing for the SL transmission, based on the capability information of the UE; and
    transmitting an SL signal, based on the transmission timing and the transmission power,
    wherein the SL signal is transmitted simultaneously with a UL signal,
    wherein the capability information of the UE includes (i) information on whether the UE can independently determine the transmission timing for the SL transmission and a transmission timing for the UL transmission and/or (ii) information on whether the UE can independently determine the transmission power for the SL transmission and transmission power for the UL transmission, and
    when the capability information of the UE includes information that the UE can independently determine the transmission timing for the SL transmission and the transmission timing for the UL transmission, the transmission timing for the SL transmission is determined independently of the transmission timing for the UL transmission.

2. The method of claim 1, further comprising:
    transmitting the capability information of the UE to the base station.

3. The method of claim 2, further comprising:
    receiving scheduling information based on the capability information of the UE from the base station,
    wherein the SL signal is transmitted based on the transmission timing, the transmission power, and the scheduling information.

4. The method of claim 1,
    when the capability information of the UE includes information that the UE cannot independently determine the transmission timing for the SL transmission and the transmission timing for the UL transmission, the transmission timing for the SL transmission is determined to be the same as the transmission timing for the UL transmission.

5. The method of claim 1,
    when the capability information of the UE includes information that the UE can independently determine the transmission power for the SL transmission and the transmission power for the UL transmission, the transmission power for the SL transmission is determined independently of the transmission power for the UL transmission.

6. The method of claim 1,
    when the capability information of the UE includes information that the UE cannot independently determine the transmission power for the SL transmission and the transmission power for the UL transmission, the transmission power for the SL transmission is determined based on the same method as the transmission power for the UL transmission.

7. The method of claim 1,
    wherein the capability information includes (i) information on whether the UE can independently determine the transmission timing for the SL transmission and the transmission timing for the UL transmission, (ii) information on whether the UE can independently determine the transmission power for the SL transmission and the transmission power for the UL transmission, and/or (iii) information on whether separate antennas are supported for the SL transmission and the UL transmission.

8. The method of claim 1,
    wherein the information on whether the UE can independently determine the transmission timing for the SL transmission and the transmission timing for the UL transmission may include information on whether a transceiver of the UE includes a single phase locked loop (PLL) or a separate PLL for the UL transmission and the SL transmission.

9. The method of claim 1,
    wherein information on whether the UE can independently determine the transmission power for the SL transmission and the transmission power for the UL transmission includes information on whether a transceiver of the UE includes a single Power Amplifier (PA) or a separate PA for the UL transmission and the SL transmission.

10. A User Equipment (UE) performing sidelink communication,
    at least one transceiver;
    at least one processor; and
    at least one memory for storing instructions and operably electrically connectable with the at least one processor;
    operations performed based on execution of the instructions by the at least one processor include:
    determining transmission power for SL transmission based on capability information of the UE,
    wherein the capability information of the UE is information related to a capability of the UE related to the SL transmission and uplink (UL) transmission;
    determining a transmission timing for the SL transmission, based on the capability information of the UE; and
    transmitting an SL signal, based on the transmission timing and the transmission power,
    wherein the SL signal is transmitted simultaneously with a UL signal,
    wherein the capability information of the UE includes (i) information on whether the UE can independently determine the transmission timing for the SL transmission and a transmission timing for the UL transmission and/or (ii) information on whether the UE can independently determine the transmission power for the SL transmission and transmission power for the UL transmission, and
    when the capability information of the UE includes information that the UE can independently determine the transmission timing for the SL transmission and the transmission timing for the UL transmission, the transmission timing for the SL transmission is determined independently of the transmission timing for the UL transmission.

11. The UE of claim 10, wherein the UE is an autonomous driving device communicating with at least one of a mobile terminal, a network and an autonomous vehicle other than the UE.

12. A method for performing communication, the method performed by a base station and comprising:
   receiving capability information of User Equipment (UE) from the UE,
   wherein the capability information of the UE is information related to a capability of the UE related to SL transmission and uplink (UL) transmission,
   wherein the capability information of the UE includes (i) information on whether the UE can independently determine a transmission timing for the SL transmission and a transmission timing for the UL transmission and/or (ii) information on whether the UE can independently determine transmission power for the SL transmission and transmission power for the UL transmission; and
   based on the capability information of the UE, transmitting scheduling information to the UE, and
   when the capability information of the UE includes information that the UE can independently determine the transmission timing for the SL transmission and the transmission timing for the UL transmission, the transmission timing for the SL transmission is determined independently of the transmission timing for the UL transmission.

* * * * *